United States Patent
Matsumoto et al.

(10) Patent No.: US 10,573,991 B2
(45) Date of Patent: Feb. 25, 2020

(54) COVER MEMBER, COVER UNIT, AND CONNECTOR

(71) Applicant: J.S.T. Mfg. Co., Ltd., Osaka-shi, Osaka (JP)

(72) Inventors: Hiroyuki Matsumoto, Yokohama (JP); Shinya Masada, Yokohama (JP); Saki Katsumoto, Yokohama (JP)

(73) Assignee: J.S.T. MFG. CO., LTD., Osaka-shi (JP)

(*) Notice: Subject to any disclaimer, the term of this patent is extended or adjusted under 35 U.S.C. 154(b) by 0 days.

(21) Appl. No.: 15/827,068

(22) Filed: Nov. 30, 2017

(65) Prior Publication Data

US 2018/0183173 A1 Jun. 28, 2018

(30) Foreign Application Priority Data

Dec. 28, 2016 (JP) .................................. 2016-255121

(51) Int. Cl.
| | |
|---|---|
| *H01R 13/50* | (2006.01) |
| *H02G 3/08* | (2006.01) |
| *H01R 13/52* | (2006.01) |
| *H01R 13/60* | (2006.01) |
| *H01R 13/443* | (2006.01) |

(52) U.S. Cl.
CPC ....... *H01R 13/501* (2013.01); *H01R 13/5213* (2013.01); *H01R 13/60* (2013.01); *H02G 3/081* (2013.01); *H02G 3/088* (2013.01); *H01R 13/443* (2013.01); *H01R 2201/26* (2013.01)

(58) Field of Classification Search
CPC .. H01R 13/501; H01R 13/60; H01R 13/5213; H01R 13/443; H01R 2201/26; H02G 3/088; H02G 3/081
See application file for complete search history.

(56) References Cited

U.S. PATENT DOCUMENTS

| | | | |
|---|---|---|---|
| 5,660,408 A | 8/1997 | Johnson | |
| 6,028,267 A * | 2/2000 | Byrne | H01R 13/518 174/55 |
| 6,083,016 A | 7/2000 | Waynick | |
| 8,986,022 B2 * | 3/2015 | Dinh | H01R 13/5213 439/131 |
| 9,667,017 B2 * | 5/2017 | Suzuki | H01R 11/01 |
| 2004/0029431 A1 * | 2/2004 | Comini | H01R 4/2458 439/417 |

(Continued)

FOREIGN PATENT DOCUMENTS

| | | |
|---|---|---|
| JP | H07-008971 U | 2/1995 |
| WO | 2007010097 A1 | 1/2007 |

OTHER PUBLICATIONS

Extended European Search Report for corresponding European Patent Application No. 17209945.9, dated Jul. 18, 2018 (11 Sheets).

*Primary Examiner* — Truc T Nguyen
(74) *Attorney, Agent, or Firm* — Kratz, Quintos & Hanson, LLP

(57) ABSTRACT

A cover member which is to be mated with a connector member and has a cover housing to be attached to an attached member. The cover housing has a plurality of attaching parts for attachment to the attached member. The attaching parts are formed so that the directions of mating with the connector member are different directions with respect to the attached member.

15 Claims, 23 Drawing Sheets

(56) References Cited

U.S. PATENT DOCUMENTS

| | | | | |
|---|---|---|---|---|
| 2006/0211275 A1* | 9/2006 | Akamatsu | ............ | H01R 35/025 439/62 |
| 2007/0254496 A1* | 11/2007 | Koiwaya | ................ | H01R 35/02 439/31 |
| 2010/0035451 A1* | 2/2010 | Eichhorst | ............... | H01R 31/06 439/224 |
| 2011/0312209 A1* | 12/2011 | Krueger | ............ | H01R 13/5812 439/445 |
| 2014/0065858 A1* | 3/2014 | Kojima | ................ | H01R 13/447 439/131 |
| 2014/0273559 A1* | 9/2014 | Schaefer | .............. | H01R 13/648 439/92 |
| 2014/0377978 A1* | 12/2014 | Okamoto | ........... | H01R 13/5202 439/345 |
| 2015/0024629 A1* | 1/2015 | Snader | ............... | H01R 13/5219 439/607.01 |
| 2015/0214662 A1* | 7/2015 | Muro | .................... | H01R 13/73 439/345 |
| 2015/0340786 A1* | 11/2015 | Nishio | ................. | H01R 12/714 439/630 |
| 2015/0357771 A1* | 12/2015 | Chen | ...................... | H01R 24/70 439/607.01 |
| 2016/0111800 A1* | 4/2016 | Strom | ..................... | H01R 4/34 439/682 |
| 2016/0197461 A1* | 7/2016 | Kitamura | ............... | H01R 24/20 174/72 A |

\* cited by examiner

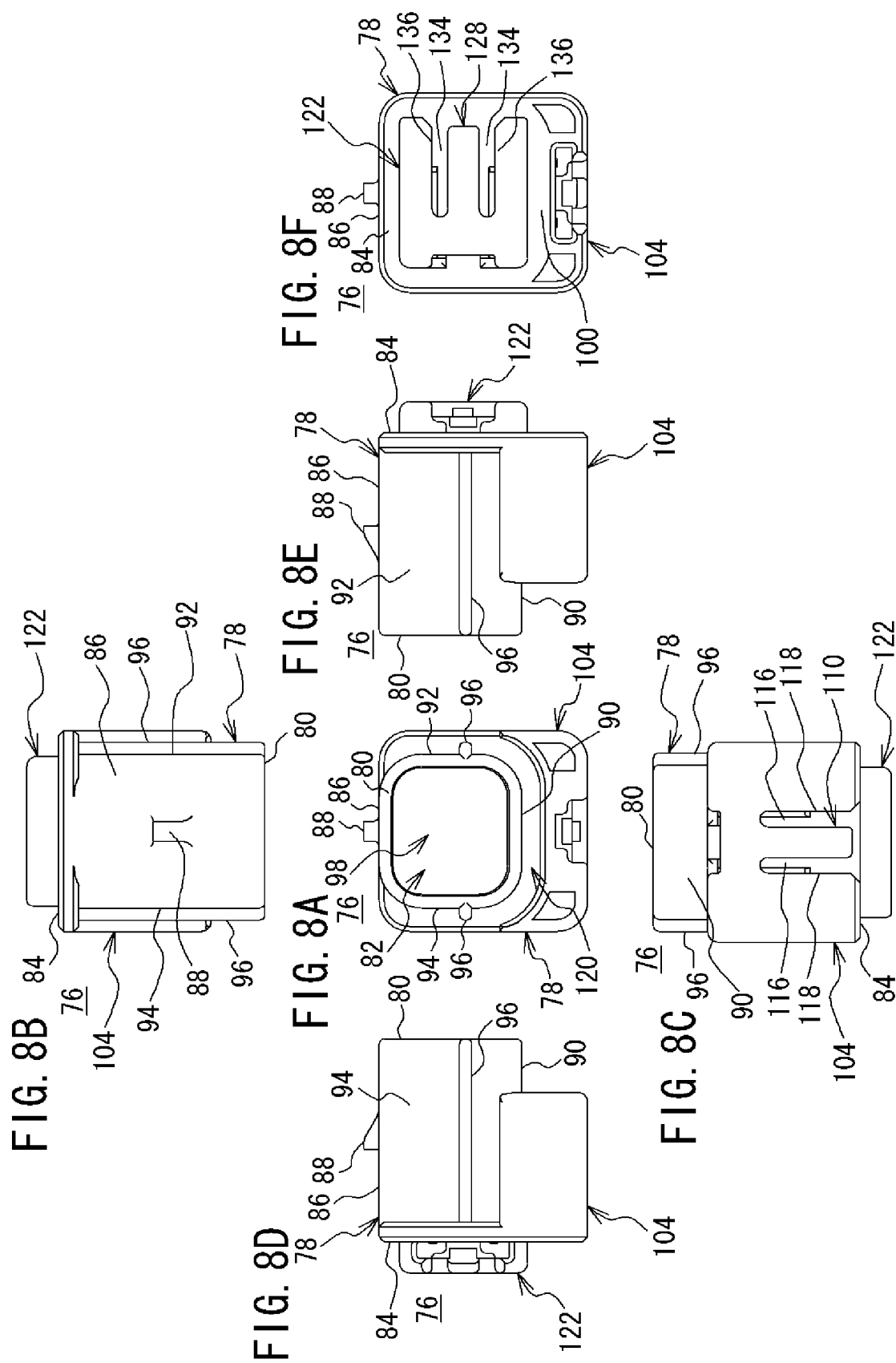

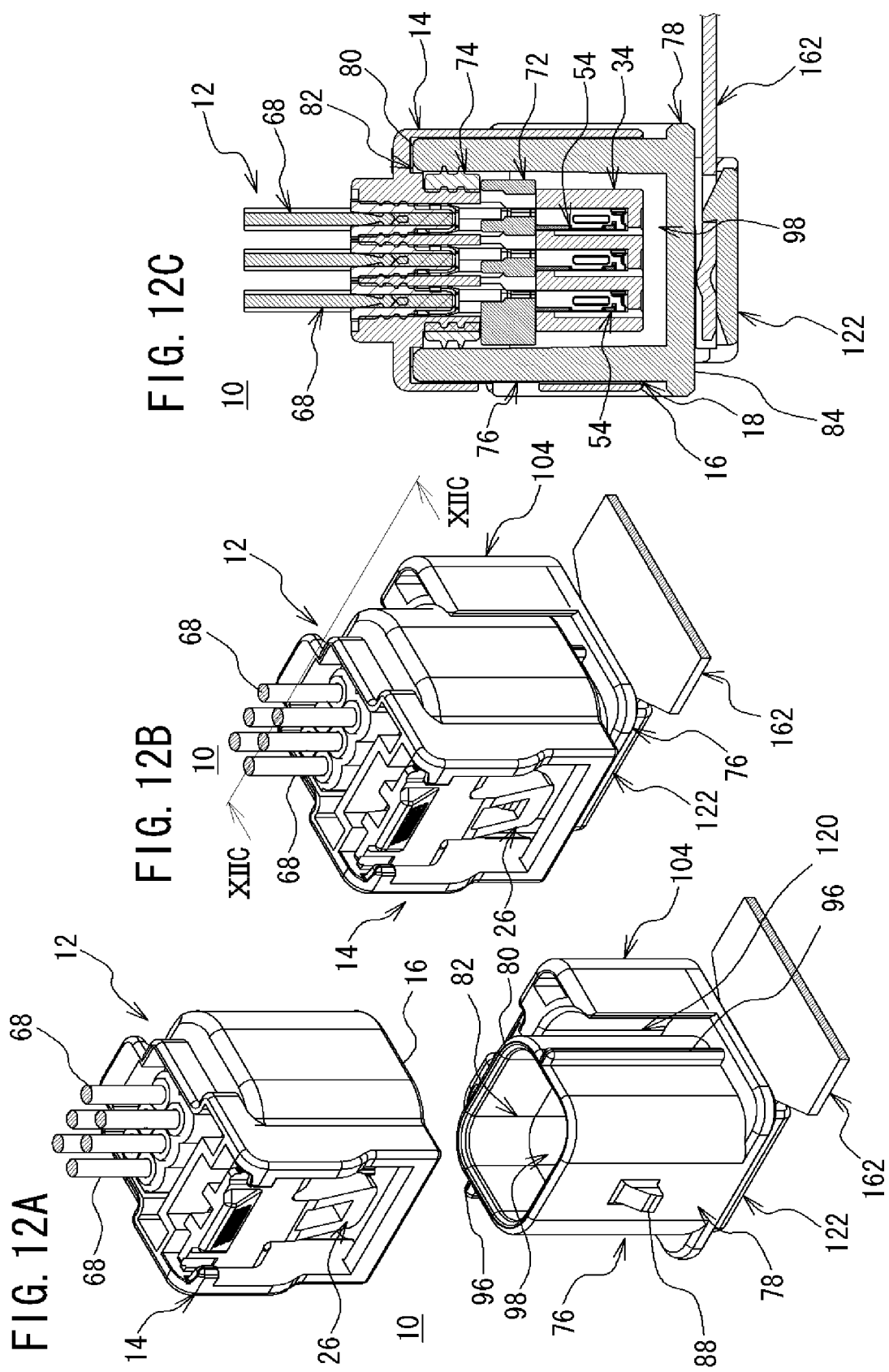

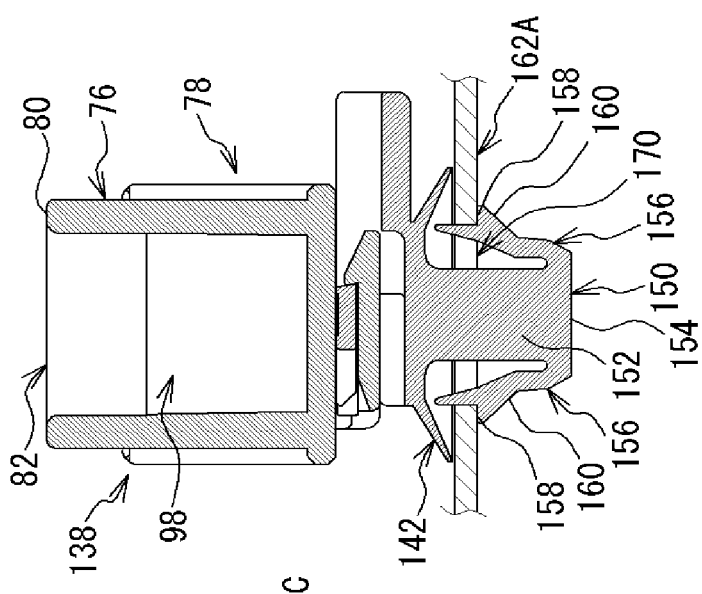
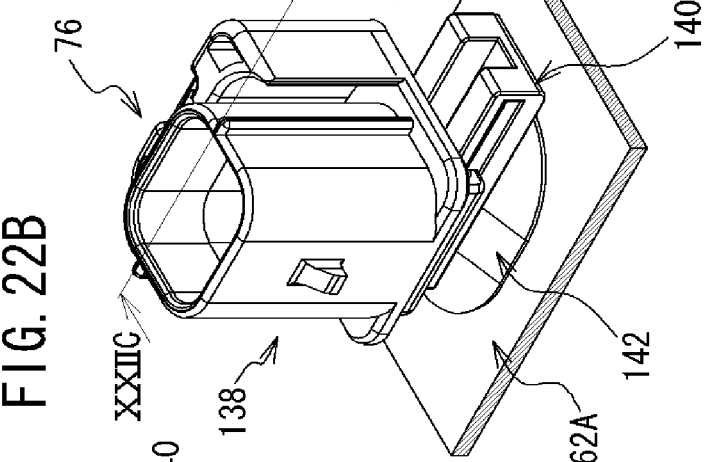
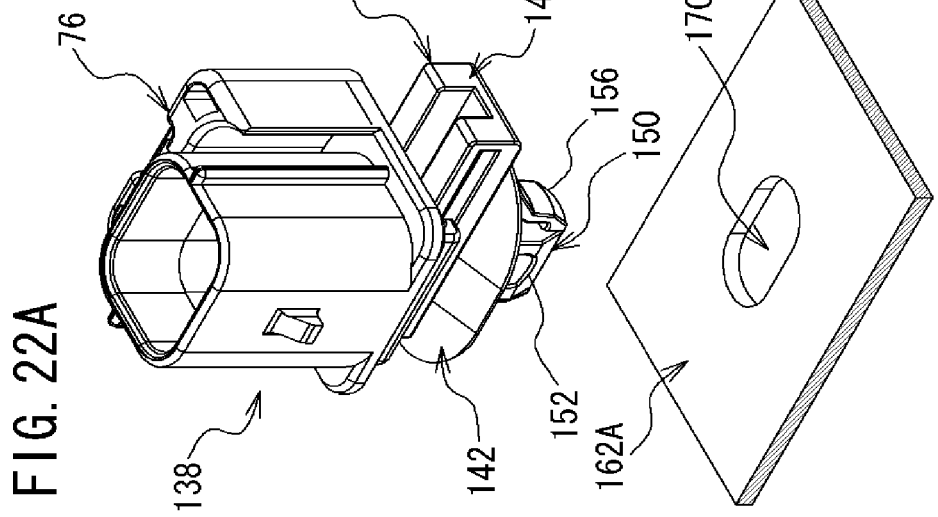

COVER MEMBER, COVER UNIT, AND CONNECTOR

BACKGROUND

Technical Field

The present invention relates to a cover member, a cover unit, and a connector having a protection function from water, dust, etc. in a mated state with a connector member and capable of fixing the mated connector member at any of a plurality of determined positions.

Related Art

For example, in a vehicle such as a two-wheeled vehicle or an automobile, as a member which is to attach and fix a connector member, which is not used other than inspections, to a vehicle body and to protect the member from water, dust, etc., for example, a dummy cap is disclosed in JP H07-008971 U. The invention of the dummy cap disclosed in JP H07-008971 U is the dummy cap including: a cap part which is mated with an opening of a connector housing disposing terminals therein and protects the terminals therein; a clip part which can be latched/unlatched with respect to a fixed member side. Moreover, the above described clip part is integrally formed with the above described cap part.

SUMMARY

However, if the dummy cap disclosed in JP H07-008971 U is used, attachment is carried out with the attachment direction which is only in one direction, i.e., a horizontal direction with respect to the fixed member. Therefore, the attaching direction is limited, and workability may be impaired.

The present invention has been accomplished in order to solve the problem of the conventional techniques as described above. It is an object of the present invention to provide a cover member, a cover unit, and a connector capable of selecting the direction of attaching a connector member with respect to an attached member, which is attached thereto.

In order to achieve the above described object, a cover member of a first aspect of the present invention is a cover member that is mated with a connector member and has a cover housing attached to an attached member, wherein the cover housing has a plurality of attaching parts for attachment to the attached member.

In a cover member of a second aspect according to the cover member of the first aspect, the attaching parts are formed so that directions of mating with the connector member are different directions with respect to the attached member.

In a cover member of a third aspect according to the cover member of the first or second aspect, the attaching parts include: a first attaching part with which the cover housing can be attached to the attached member along a direction in which the connector member is mated; and a second attaching part with which the cover housing can be attached to the attached member in a direction orthogonal to the direction in which the connector member is mated.

In a cover member of a fourth aspect according to the cover member of the first aspect, the attaching parts are formed so that directions of mating with the connector member are the same direction with respect to the attached member.

In a cover member of a fifth aspect according to the cover member of the first aspect, as the attaching parts of the cover housing, attaching parts with which the directions of mating with the connector member are different directions with respect to the attached member and an attaching part with which the direction is the same as at least one of the attaching parts having the different directions are formed.

In a cover member of a six aspect according to the cover member of any of the first to fifth aspects, the cover housing is configured to be attached by inserting the attached member to the attaching part.

In a cover member of a seventh aspect according to the cover member of any of the first to sixth aspect, each of the attaching part is provided with a latch part latched with a latched part provided on the inserted attached member.

In a cover member of an eighth aspect according to the cover member of any of first to fifth aspects, the cover housing is configured to be attached by inserting the attaching part to a hole part formed in the attached member.

A cover unit of a ninth aspect has: a cover member having a cover housing mated with a connector member and an attachment auxiliary member attached to the cover member, wherein a plurality of attaching parts are formed on the cover housing, and the attachment auxiliary member has a mounting part mounted on any of the attaching parts.

In a cover unit of a tenth aspect according to the cover unit of the ninth aspect, the attaching parts of the cover housing are formed so that directions of mating with the connector member are different directions with respect to the attached member.

In a cover unit of an eleventh aspect according to the cover unit of the tenth aspect, the attaching parts include: a first attaching part with which the cover housing can be attached to the attached member along a direction in which the connector member is mated; and a second attaching part with which the cover housing can be attached to the attached member in a direction orthogonal to the direction in which the connector member is mated.

In a cover unit of a twelfth aspect according to the cover unit of the ninth aspect, the attaching parts of the cover housing are formed so that directions of mating with the connector member are the same direction with respect to the attached member.

In a cover unit of a thirteenth aspect according to the cover unit of the ninth aspect, as the attaching parts of the cover housing, attaching parts with which the directions of mating with the connector member are different directions with respect to the attached member and an attaching part with which the direction is the same as at least one of the attaching parts having the different directions are formed.

In a cover unit of a fourteenth aspect according to the cover units of the ninth to thirteenth aspects, the attachment auxiliary member has a clip part inserted and fixed in a hole part formed in the attached member.

A connector of a fifteenth aspect has the cover member according to any of the first to eighth aspects and the connector member mated with each other.

A connector of a sixteenth aspect has the cover member of the cover unit according to any of the ninth to fourteenth aspects and the connector member mated with each other.

According to the cover member of the first embodiment, in a case where the connector member is to be attached to the attached member, the connector member can be attached in an easily attachable direction of the connector member.

According to the cover member of the second or third aspect, in a case where the connector member is to be attached to the attached member, the direction is not limited to one direction, and the connector member can be attached in an easily attachable direction of the connector member.

According to the cover member of the fourth aspect, in a case where the connector member is to be attached to the attached member, the connector member can be attached in an easily attachable orientation of the connector member even though the directions are the same direction.

According to the cover member of the fifth embodiment, in a case where the connector member is to be attached to the attached member, the connector member can be attached in an easily attachable direction of the connector member.

According to the cover member of the sixth aspect, in a case where the attached member is formed in a plate shape or a rod shape, attachment with the attaching part can be easily carried out.

According to the cover member of the seventh aspect, detachment from the attached member can be restrained.

According to the cover member of the eighth aspect, attachment can be easily carried out by inserting, for example, the attaching part formed in a projecting shape into the hole part formed in the attached member.

According to the cover unit of the ninth aspect, attachment to the hole part formed in the attached member can be carried out without changing the constitution of the cover member, and, in a case where the connector member is to be attached to the attached member, the connector member can be attached in an easily attachable direction of the connector member.

According to the cover unit of the tenth and eleventh aspect, in a case where the connector member is to be attached to the attached member, the direction is not limited to one direction, and the connector member can be attached in an easily attachable direction of the connector member.

According to the cover unit of the twelfth aspect, in a case where the connector member is to be attached to the attached member, the connector member can be attached in an easily attachable orientation of the connector member even though the directions are the same direction.

According to the cover unit of the thirteenth embodiment, in a case where the connector member is to be attached to the attached member, the connector member can be attached in an easily attachable direction of the connector member.

According to the cover unit of the fourteenth aspect, attachment of the attachment auxiliary member to the attached member can be easily carried out.

According to the connector of the fifteenth aspect, the connector member can be mated with the cover member, which is attached to the attached member in the mating direction of the connector member which is easily attachable.

According to the connector of the sixteenth aspect, the connector member can be mated with the cover member of the cover unit, which is attached to the attached member in the mating direction of the connector member which is easily attachable.

BRIEF DESCRIPTION OF DRAWINGS

FIG. 8A is a front view of the cover member; FIG. 8B is a plan view; FIG. 8C is a bottom view; FIG. 8D is a lateral view; FIG. 8E is a lateral view from a different direction; FIG. 8F is a rear view;

FIG. 12A is a perspective view explaining mating of the cover member to which the attached member is attached from the other side and the connector member; FIG. 12B is a perspective view showing a state in which the cover member and the connector member are mated; FIG. 12C is a cross-sectional view at a line XIIC-XIIC of FIG. 12B;

FIG. 22A is a perspective view explaining a case where the cover unit, in which the attachment auxiliary member is mounted on the cover member from the other side, is attached to the attached member; FIG. 22B is a perspective view showing a state in which the cover unit is attached to the attached member; FIG. 22C is a cross-sectional view at a line XXIIC-XXIIC of FIG. 22B.

DETAILED DESCRIPTION

Hereinafter, embodiments of the present invention will be described with reference to drawings. However, the embodiments shown below show examples of a cover member, a cover unit, and a connector for embodying technical ideas of the present invention and are not intended to specify the present invention to these, and the present invention can be equally applied to other embodiments included in claims.

First Embodiment

Figure 1A:
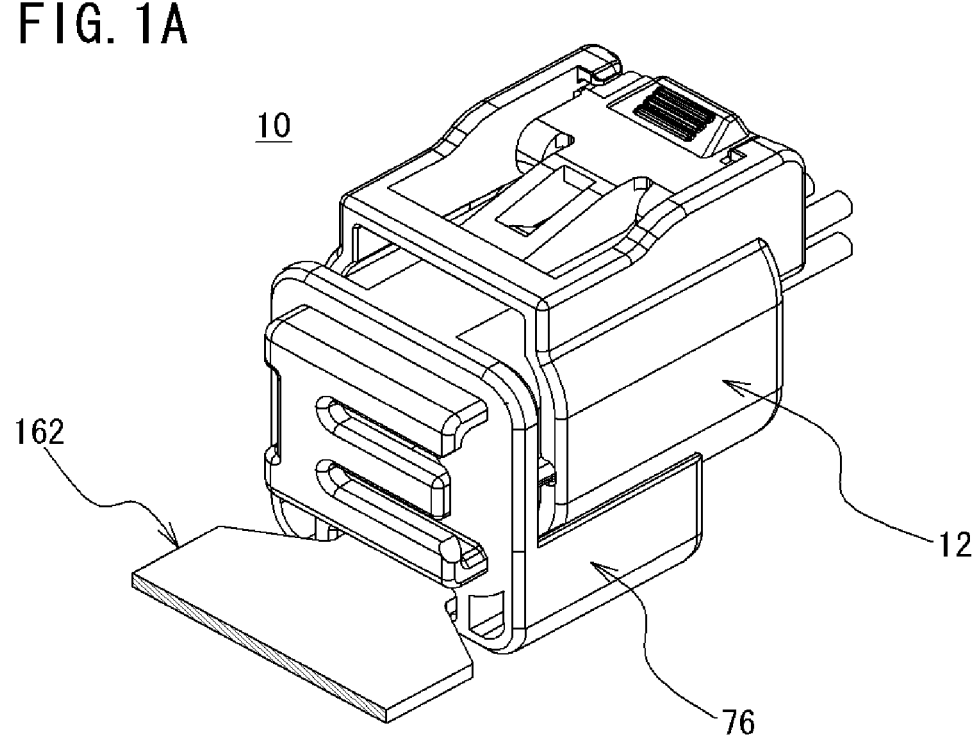
FIG. 1A is a perspective view showing a state in which a connector of a first embodiment is attached to an attached member from one side.
Figure 1B:
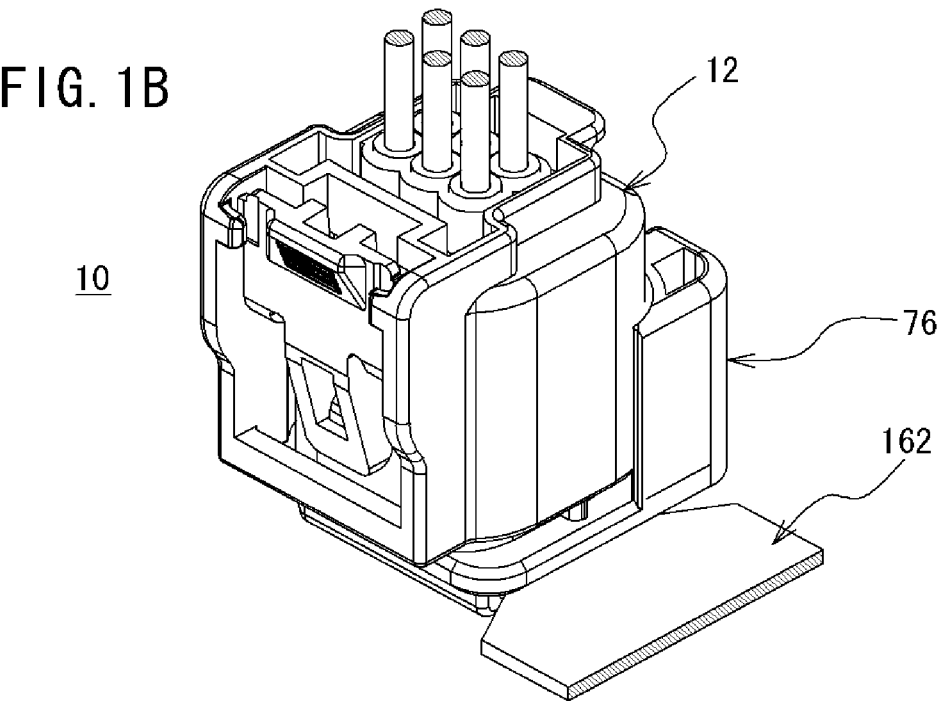
FIG. 1B is a perspective view showing a state in which the connector is attached to the attached member from a different direction.

First, a connector 10 according to a first embodiment will be described with reference to FIGS. 1A to 12C. As shown in FIGS. 1A and 1B, the connector 10 of the first embodiment has a connector member 12, which is provided with at least one contact 54, and a cover member 76, which is mated with the connector member 12; and the connector member 12 and the cover member 76 are configured to be mated with each other.

The connector member 12 of the first embodiment is to be used in inspections, etc. of vehicles, etc. such as two-wheeled vehicles and automobiles, and is to be used by being connected with a counterpart-side connector member provided on an apparatus for the inspection. On the other hand, in a case where the connector member 12 is not used in the inspections, etc., the connector member 12 is fixed to a vehicle or the like and is protected from water, dust, etc. by mating the connector member 12 with the cover member 76, which is attached in advance to an attached member 162 provided at a predetermined location of the vehicle or the like.

Figure 2:
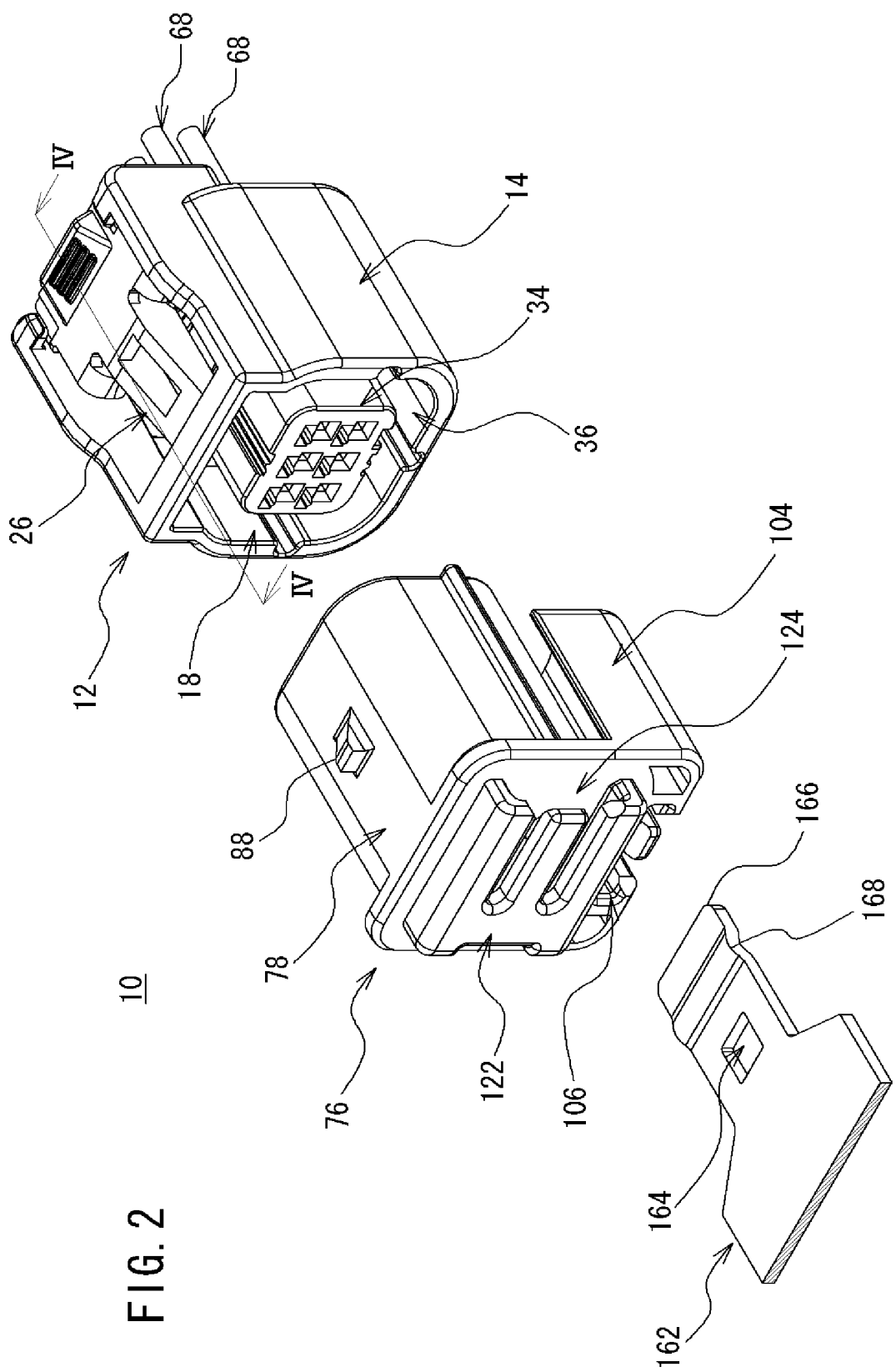
FIG. 2 is an exploded perspective view of the connector and the attached member in the state shown in FIG. 1A.
Figure 3:
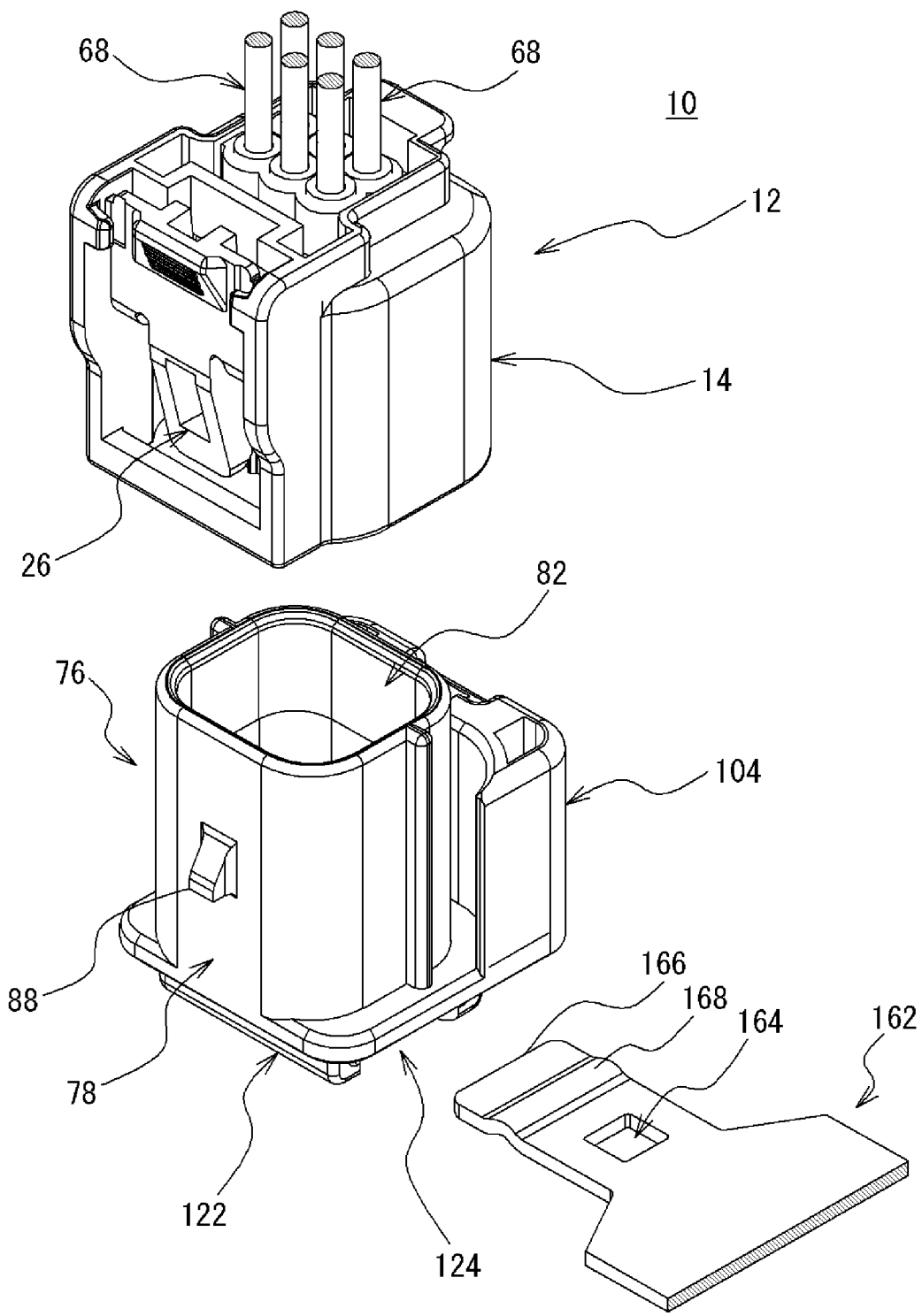
FIG. 3 is an exploded perspective view of the connector and the attached member in the state shown in FIG. 1B.

In this case, regarding attachment of the cover member 76 to the attached member 162, the connector 10 of the first embodiment is configured to be able to select, for example, a case where the connector is attached so that the mating direction of the connector member 12 and the cover member 76 is an approximately horizontal direction with respect to the attached member 162 as shown in FIG. 1A and FIG. 2 and a case where the connector is attached so that the mating direction of the connector member 12 and the cover member 76 is an approximately perpendicular direction with respect to the attached member 162 as shown in FIG. 1B and FIG. 3.

In other words, the cover member 76 is configured to be in a case where the connector member 12 is horizontally mated with respect to the attached member 162 as shown in FIG. 1A and FIG. 2 or in a case where the connector member 12 is perpendicularly mated with respect to the attached member 162 as shown in FIG. 1B and FIG. 3.

As shown in FIG. 2 and FIG. 3, the attached member 162 of the first embodiment is formed by a plate-shaped body having a width which can be inserted into a later-described attaching part 104 or 122 formed on the cover member 76, and a latched part 164 boring part of the surface of the attached member 162 is formed. On the attached member 162, a protruding part 168 bulging in a protruding shape is formed in a direction orthogonal to an inserting direction, wherein the protruding part 168 is formed between a tip part 166, which is to be inserted first into the attaching part 104 or 122 of the cover member 76, and the latched part 164. Hereinafter, each constitution will be described.

First, with reference to FIGS. 4 to 6C, the connector member 12 of the first embodiment will be described. The connector member 12 of the first embodiment includes: at least one contact 54, in the first embodiment, six contacts 54 on which an electric wire(s) 68 is(are) mounted, respectively; a connector housing 14 housing the contacts 54; and a retainer 72 which fixes each of the contacts in the connector housing 14. Moreover, in the connector member 12, a resin-made seal member 74 which fills a gap with the cover member 76 mated is provided, and each of the electric wires 68 is provided with a resin-made electric-wire seal member 70 which fills a gap between the electric wire 68 and an electric-wire retaining part 42 (see FIG. 4) in the connector housing 14.

As shown in FIGS. 5A and 5B and FIGS. 6A to 6C, the connector housing 14 of the connector member 12 of the first embodiment has: a front surface 16 on one side having an opening 18 to which the cover member 76 is to be inserted; a rear surface 20 on the other side, wherein insertion openings 22 to which the plurality of electric wires 68 mounted on the contacts 54 are to be inserted are formed; an upper surface 24 on which a lock mechanism 26 is formed; a bottom surface 28 opposed to the upper surface 24; a first lateral surface 30; and a second lateral surface 32; and these surfaces are integrally formed of a resin material.

Moreover, in the inner side of the connector housing 14, a pillar-shaped contact retaining part 34, which retains the contacts 54, are formed to project from the rear-surface-20 side toward the front-surface-16 side, and, in the front-surface-16 side of the contact retaining part 34, a plurality of contact insertion openings 38 to which counterpart-side contacts (illustration omitted) are to be inserted are formed.

Furthermore, in the contact retaining part 34, contact housing parts 40 housing and retaining the contacts 54 are formed and are communicating with the contact insertion openings 38. Meanwhile, in the rear-surface-20 side of the contact retaining part 34, the electric-wire retaining parts 42 retaining the electric wires 68 are formed and are respectively communicating with the insertion openings 22 formed on the rear surface 20 of the connector housing 14. The contact housing parts 40 and the electric-wire retaining parts 42 are formed to be communicated with each other, respectively, in the contact retaining part 34, and the contact insertion openings 38 in the front-surface-16 side and the insertion openings 22 in the rear-surface-20 side are communicated with each other.

Meanwhile, in the contact retaining part 34, lances 46, which fix the contacts 54 housed in the contact housing parts 40, are formed.

A gap part 36 is formed between the inner side of the connector housing 14 in the upper-surface-24 side, the bottom-surface-28 side, the first-lateral-surface-30 side, and the second-lateral-surface-32 side and the outer periphery of the contact retaining part 34. Later-described part of the cover member 76 is configured to be inserted to the gap part 36. The rear-surface-20 side of the outer periphery of the contact retaining part 34 serves as a seal-member attaching part 44 to which the seal member 74 is attached.

A retainer insertion opening 50 to which the retainer 72 is inserted is formed on the second lateral surface 32 of the connector housing 14, and, in the connector housing 14, a retainer attaching part 52 to which the retainer 72 is attached is formed from the second lateral surface 32 to the first-lateral-surface-30 side.

Furthermore, on the inner sides of the first lateral surface 30 and the second lateral surface 32 of the connector housing 14, guide groove parts 48, which are formed in groove shapes along the mating direction, are formed, respectively. The guide groove parts 48 are configured to be mated with later-described guide projecting parts 96, which are formed on the cover member 76, and guide the guide projecting parts in the case of mating.

The lock mechanism 26 formed in the upper-surface-24 side of the connector housing 14 is a part to be engaged with a later-described engagement part 88 formed on the cover member 76.

Figure 4:
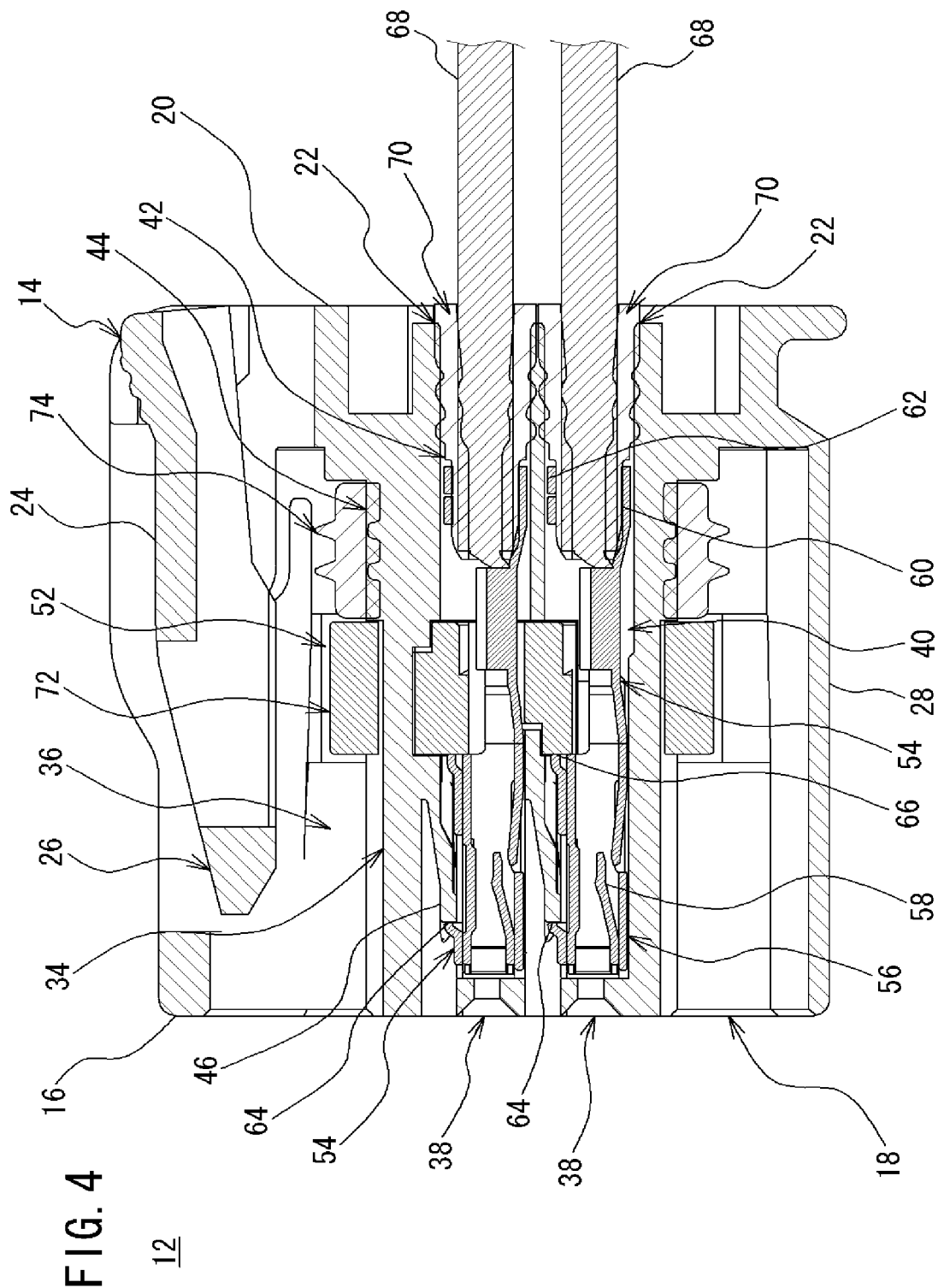
FIG. 4 is a cross-sectional view at a line IV-IV of FIG. 2 according to the connector member.
Figure 5A:
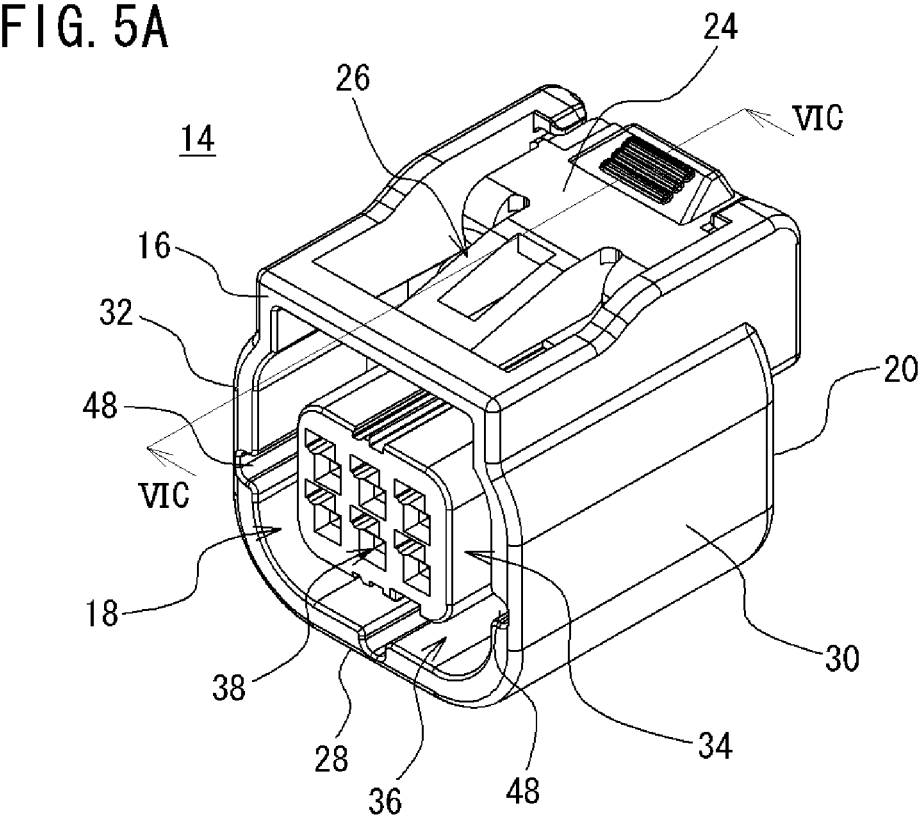
FIG. 5A is a perspective view of a housing.
Figure 5B:
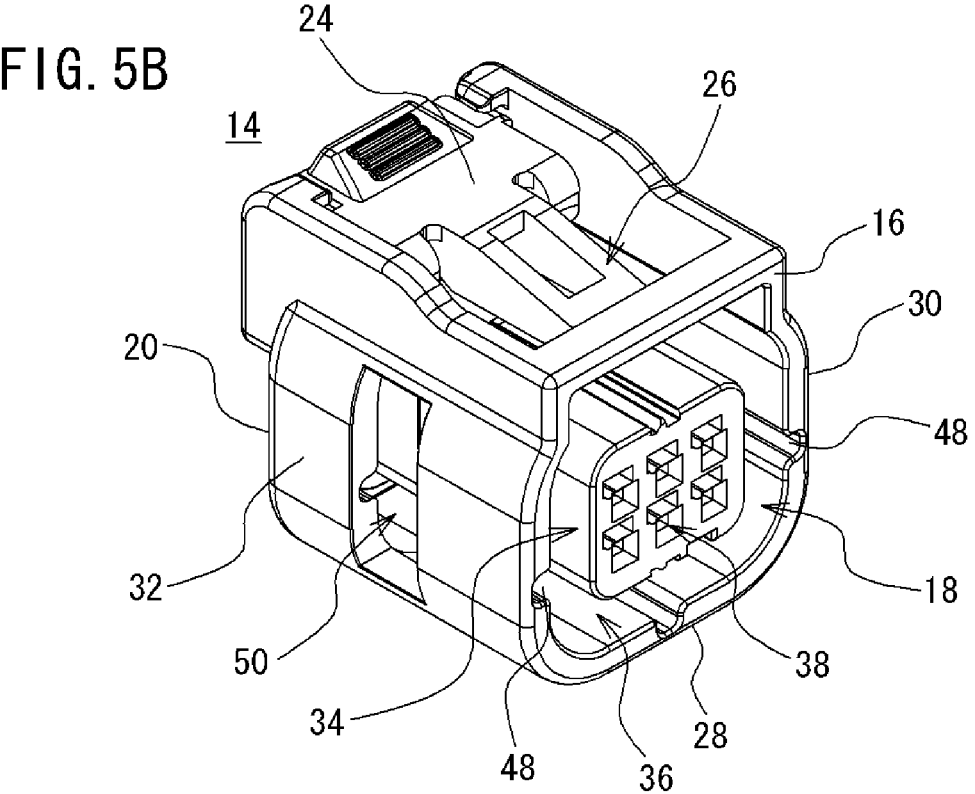
FIG. 5B is a perspective view from another side.
Figure 6A:
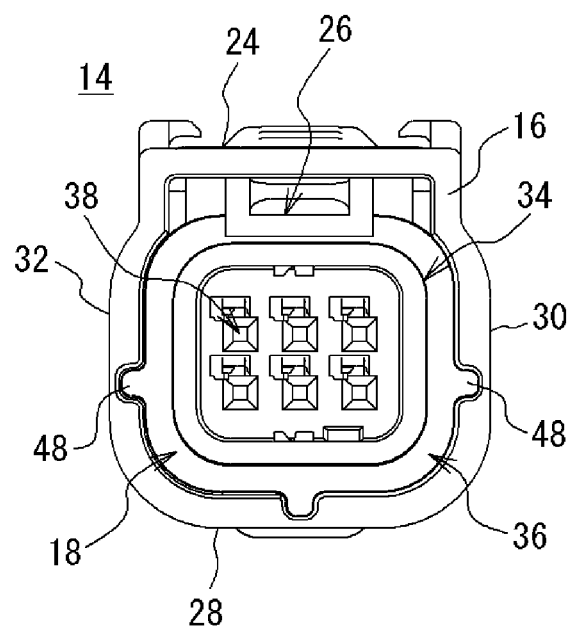
FIG. 6A is a front view of the housing.
Figure 6B:
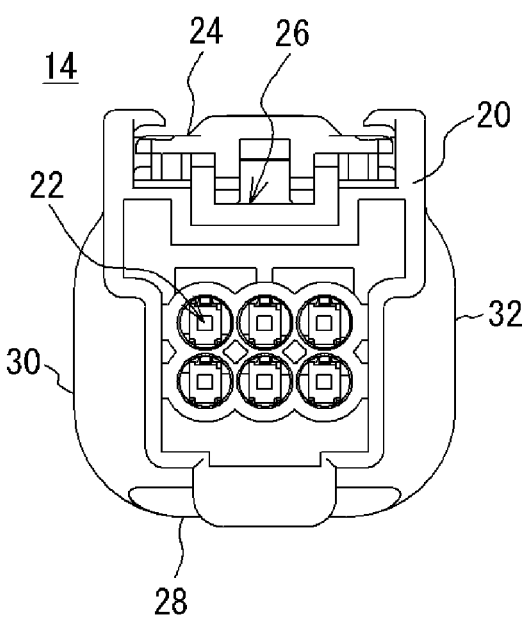
FIG. 6B is a rear view.
Figure 6C:
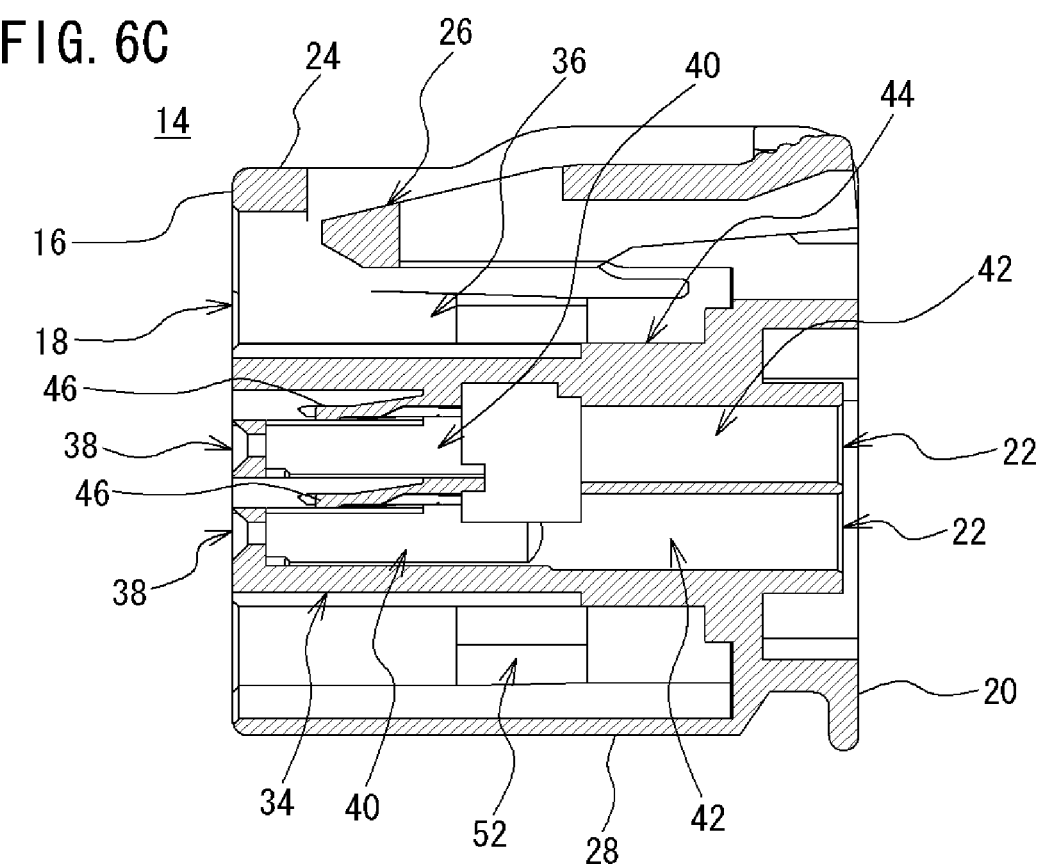
FIG. 6C is a cross-sectional view at a line VIC-VIC of FIG. 5A.

As shown in FIG. 4, each of the contacts 54 of the first embodiment has, in one side, a contact part 56 including a contact piece 58, which is to contact a contact (illustration omitted) of the counterpart-side connector member; and, in the other side, an electric-wire connecting part 60 to which the electric wire 68 is to be connected is formed. The electric-wire connecting part 60 has a plurality of connecting pieces 62, and the electric wire 68 is configured to be mounted by being sandwiched by these. Herein, the connecting pieces 62 are configured to sandwich the electric wire 68 together with the electric-wire seal member 70. The electric wires 68 mounted on the contacts 54 are connected to, for example, various equipment, devices, etc. provided in a vehicle.

In the side of the contact 54 which is disposed in the upper-surface-24 side of the connector housing 14, a lance latching part 64 latched with the lance 46 formed on the contact retaining part 34 is formed. Furthermore, in the electric-wire-connecting-part-60 side of the contact part 56 of the contact 54, a retainer engaging part 66 engaged with the retainer 72 is formed.

In assembling of the connector member 12, first, the seal member 74 is attached to the seal-member attaching part 44 formed on the outer periphery of the contact retaining part 34, which is in the inner side of the connector housing 14.

Then, the retainer 72 is inserted from the retainer insertion opening 50 formed on the second lateral surface 32 of the connector housing 14, and the retainer 72 is temporarily retained at a predetermined temporal retaining position in the connector housing 14.

Then, the contacts 54 connecting the electric wires 68 are inserted from the insertion openings 22 formed in the rear surface 20 of the connector housing 14 so that the contact parts 56 are inserted first, thereby housing the contacts in the contact housing parts 40. In this process, the contacts 54 are configured to penetrate through a through hole (illustration omitted) formed in the temporarily retained retainer 72, the lances 46 formed in the contact retaining part 34 are configured to be latched by the lance latching parts 64 of the contacts 54. When the lances 46 are latched by the lance latching parts 64 of the contacts 54, the contacts 54 are fixed to the contact housing parts 40 and prevented from falling.

When the electric-wire seal members 70 attached to the electric wires 68 are inserted in the electric-wire retaining parts 42, the gaps between the electric wires 68 and the electric-wire retaining parts 42 are filled, and water, dust, etc. are restrained from entering.

Then, the retainer 72, which has been inserted from the retainer insertion opening 50 of the second lateral surface 32 of the connector housing 14 and been temporarily retained, is further inserted to fix the contacts 54 to the connector housing 14. In this process, the inserted retainer 72 is configured to be attached to the retainer attaching part 52 in the connector housing 14 and be engaged with the retainer engaging parts 66 of the contacts 54. Hereinabove, assembling of the connector member 12 is completed (see FIGS. 2 to 6C).

Next, the cover member 76 of the first embodiment will be described with reference to FIGS. 7A to 7C and FIGS. 8A to 8F. The cover member 76 has a cover housing 78 having: a front surface part 80 in which a mating opening 82 to be mated with the connector member 12 is formed; a rear surface part 84, which is opposed to the front surface part 80 and is closed; an upper surface part 86 on which the engagement part 88, which is to be engaged with the lock mechanism 26 of the connector member 12, is formed; a bottom surface part 90, which is opposed to the upper surface part 86; a first lateral-surface part 92; and a second lateral-surface part 94. The cover housing 78 has a box shape integrally formed of a resin material.

Figure 7A:
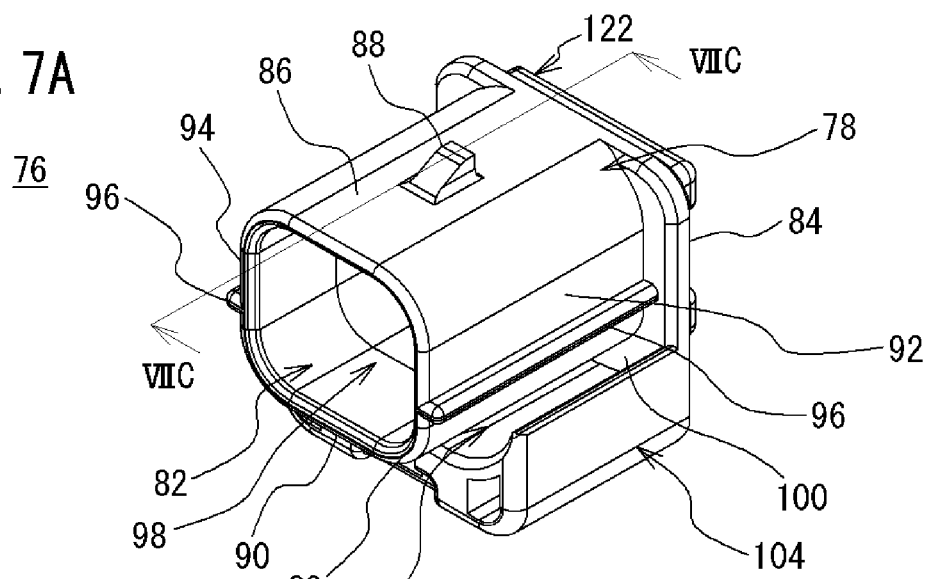
FIG. 7A is a perspective view from one side of a cover member.
Figure 7B:
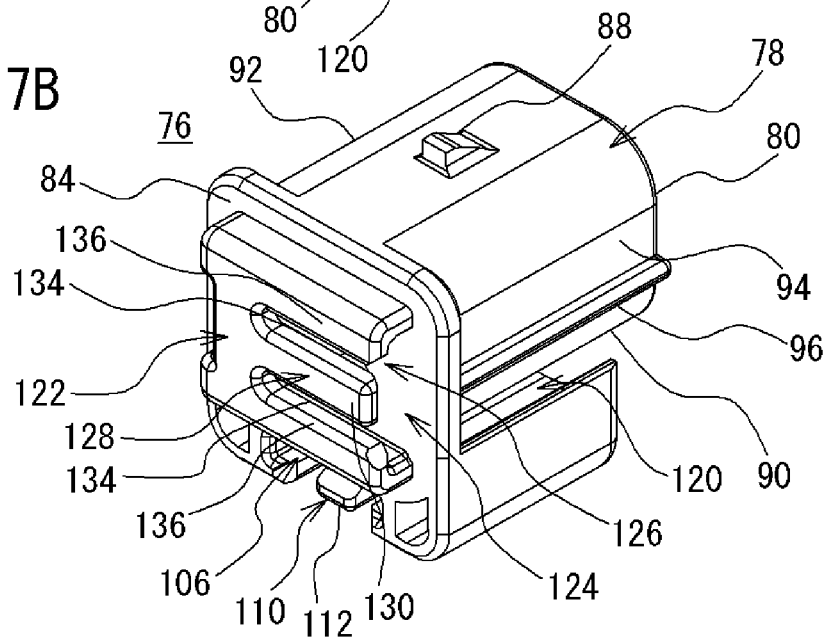
FIG. 7B is a perspective view from another side.
Figure 7C:
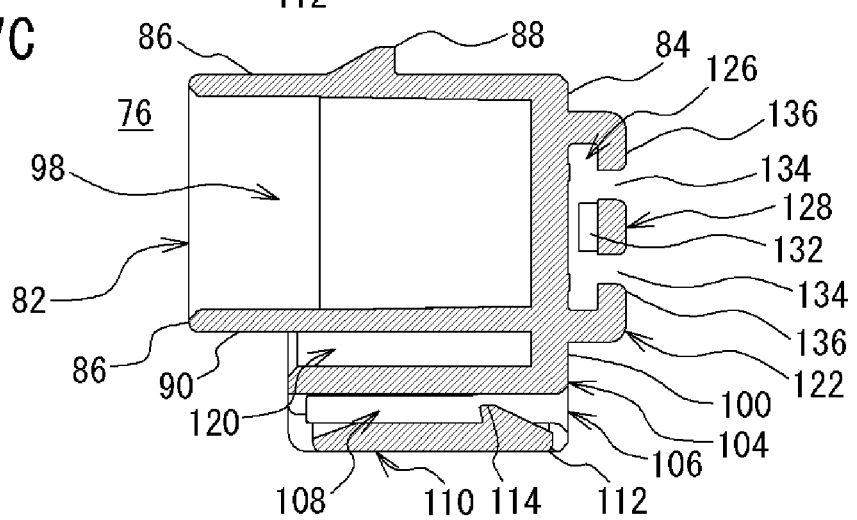
FIG. 7C is a cross-sectional view at a line VIIC-VIIC of FIG. 7A.

The interior of the cover housing 78 serves as a housing space 98, which houses the contact retaining part 34 of the connector member 12 inserted from the mating opening 82 formed in the front surface part 80. The housing space 98 is hollow as shown in FIG. 7C.

The upper surface part 86, the bottom surface part 90, the first lateral-surface part 92, and the second lateral-surface part 94 of the cover member are configured to be inserted to the gap part 36 of the connector member 12 from the front-surface-part-80 side.

The cover member 76 has the plurality of, in the first embodiment, two attaching parts 104 and 122. These attaching parts 104 and 122 include the first attaching part 104, which is formed in the bottom-surface-part-90 side of the cover housing 78, and the second attaching part 122, which is formed in the rear-surface-part-84 side.

The first attaching part 104 is provided at a position separated from the bottom-surface-part-90 side, is formed to be connected by an extending part 100 extending from the rear surface part 84, and is formed so as to have an insertion groove part 120 for allowing insertion of the bottom-surface-28 side of the connector member 12 to the part between the insertion groove part 120 and the bottom surface part 90.

The first attaching part 104 is formed in a tubular shape which surrounds the attached member 162 inserted therein, and the first-lateral-surface-part-92 side and the secondlateral-surface-part-94 side of the cover housing 78 are configured to have a curved shape partially.

In the first attaching part 104, a first insertion opening 106 to which the attached member 162 is to be inserted is formed in the rear-surface-part-84 side of the cover housing 78, and, in the interior thereof, a first disposition part 108 in which the attached member 162 inserted from the first insertion opening 106 is to be disposed is formed.

At an approximately central part of the side of the first attaching part 104 that is opposite to the insertion groove part 120, a first latch part 110, which is to be latched with the latched part 164 formed on the attached member 162, is formed. The first latch part 110 includes a first piece part 112, which is elastically deformable, and a first projecting part 114, which is projecting to the first-disposition-part-108 side of the first piece part 112. On both sides of the first piece part 112 of the first attaching part 104, first cutout parts 116, which are cutouts, are formed, respectively, and both sides of the first cutout parts 116 serve as first supporting projection parts 118, respectively.

In the cover member 76, when the attached member 162 is inserted to the first attaching part 104 of the cover housing 78 from the rear-surface-part-84 side, the connector member 12 is disposed so as to be mated approximately horizontally with respect to the attached member 162.

On the other hand, the second attaching part 122 is formed in the rear-surface-part-84 side of the cover housing 78. The second attaching part 122 is directly formed on the rear surface part 84. In the first embodiment, a second insertion opening 124 to which the attached member 162 is to be inserted is formed in the second-lateral-surface-part-94 side, and the opening is formed in a tubular shape using the rear surface part 84 as a surface so that the attached member 162 inserted therein is surrounded. In the second attaching part 122, a second disposition part 126 at which the attached member 162 inserted from the second insertion opening 124 is to be disposed is formed.

At an approximately central part of the side of the second attaching part 122 that is opposite to the rear surface part 84, a second latch part 128, which is to be latched with the latched part 164 formed on the attached member 162, is formed. The second latch part 128 includes a second piece part 130, which is elastically deformable, and a second projecting part 132, which is projecting to the second-disposition-part-126 side of the second piece part 130.

On both sides of the second piece part 130 of the second attaching part 122, second cutout parts 134, which are cutouts, are formed, respectively, and both sides of the second cutout parts 134 serve as second supporting projection parts 136, respectively.

In the cover member 76, when the attached member 162 is inserted to the second attaching part 122 of the cover housing 78 from the second lateral-surface-part-94 side, the connector member 12 is disposed so as to be mated approximately perpendicularly with respect to the attached member 162.

On the upper surface part 86 of the cover housing 78, the engagement part 88 is formed to project therefrom. The engagement part 88 is configured to be engaged with the lock mechanism 26 formed on the connector member 12.

On the first lateral-surface part 92 and the second lateral-surface part 94 of the cover housing 78, the guide projecting parts 96, which are projecting along the mating direction of the cover member 76, are formed, respectively. The guide projecting parts 96 serve as the parts which are to be mated with the guide groove parts 48 formed on the connector member 12.

Next, attachment of the cover member 76 to the attached member 162 and mating of the cover member 76 and the connector member 12 will be described. In the first embodiment, as described above, the cover member 76 enables selection of the directions of mating with the connector member 12 with respect to the attached member 162 between the case where the cover member 76 is approximately horizontally attached and the case where the cover member 76 is approximately perpendicularly attached.

First, mainly with reference to FIG. 1A, FIG. 2, FIGS. 9A to 9C, and FIGS. 10A to 10C, the case where the mating direction of the cover member 76 with the connector member 12 is approximately horizontal with respect to the attached member 162 will be described.

Figure 9A:
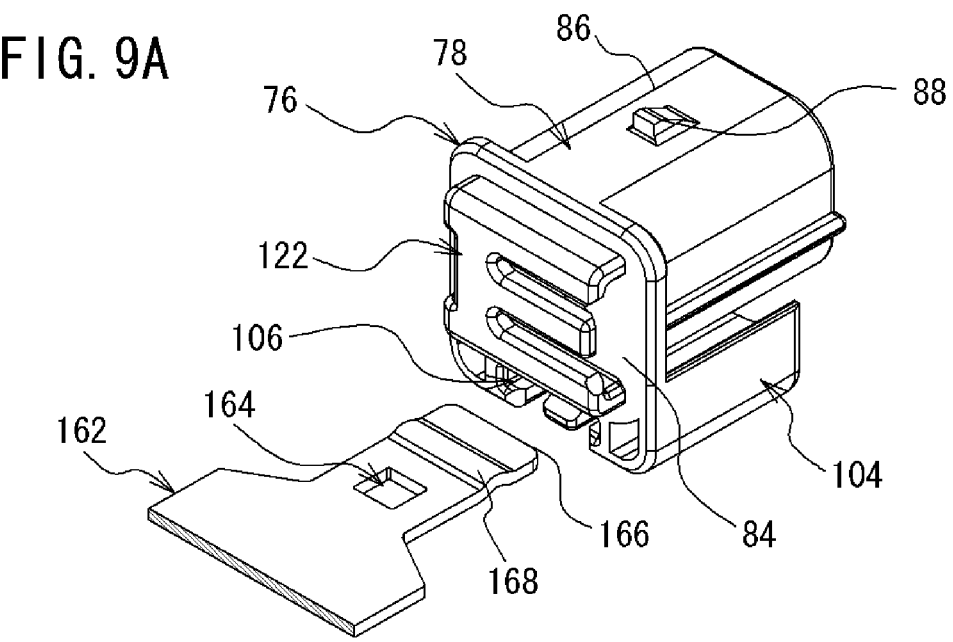
FIG. 9A is a perspective view explaining a case where the attached member is attached to the cover member from the one side.
Figure 9B:
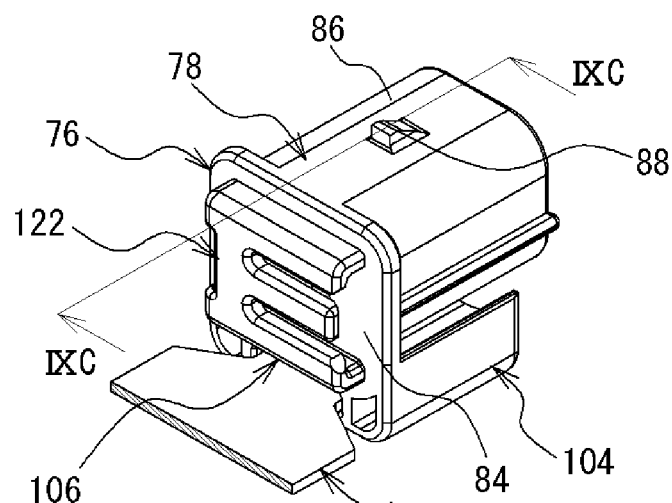
FIG. 9B is a perspective view showing a state in which the attached member is attached to the cover member.
Figure 9C:
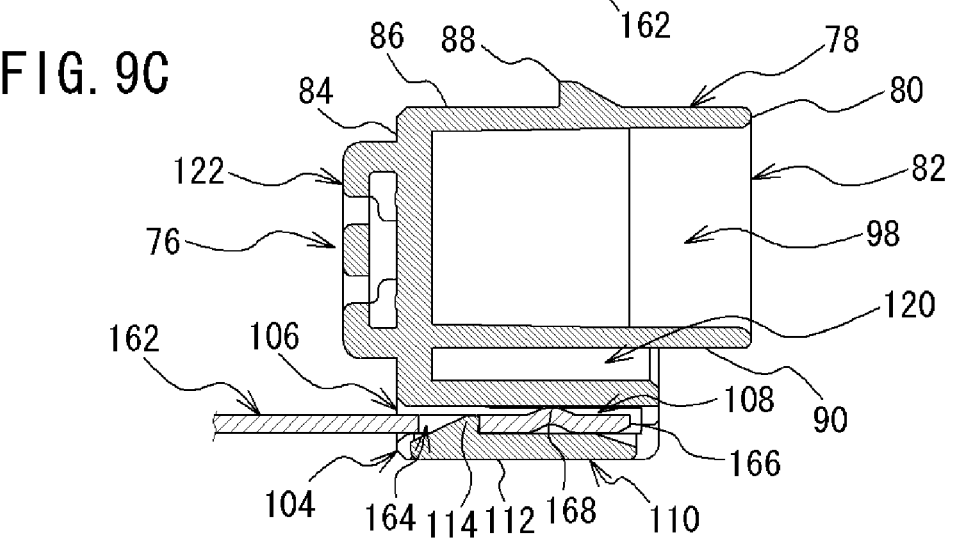
FIG. 9C is a perspective view at a line IXC-IXC of FIG. 9B.

In the case where the mating direction of the connector member 12 is approximately horizontal with respect to the attached member 162, as shown in FIGS. 9A to 9C, the attached member 162 is attached to the first attaching part 104, which is formed in the bottom-surface-part-90 side of the cover member 76. This attachment is carried out from the rear-surface-part-84 side of the cover housing 78 of the cover member 76 so that the tip part 166 of the attached member 162 is inserted first to the first insertion opening 106 of the first attaching part 104, which is formed in the bottom-surface-part-90 side. In this process, the attaching direction of the attached member 162 and the cover member 76 is the same direction as the mating direction of the connector member 12 and the cover member 76.

As shown in FIG. 9C, the first latch part 110 formed on the first attaching part 104 and the latched part 164 formed on the attached member 162 are latched, and the attached member 162 inserted in the first attaching part 104 is prevented from falling and is disposed in the first disposition part 108 in the first attaching part 104. In this process, since the protruding part 168 is formed on the attached member 162, the attached member 162 is pressed in a top-bottom direction in the first disposition part 108 of the first attaching part 104. Therefore, the vibrations, etc. of the cover member 76 are restrained, and stable attachment is enabled.

Figure 10A:
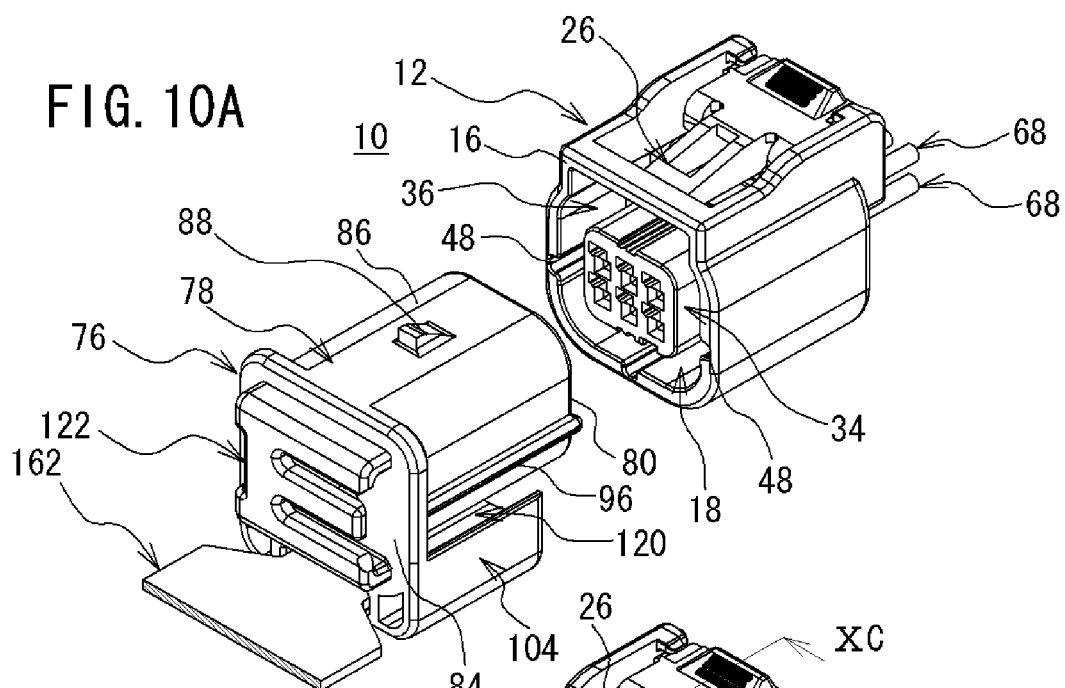
FIG. 10A is a perspective view explaining mating of the cover member to which the attached member is attached from the one side and the connector member.
Figure 10B:
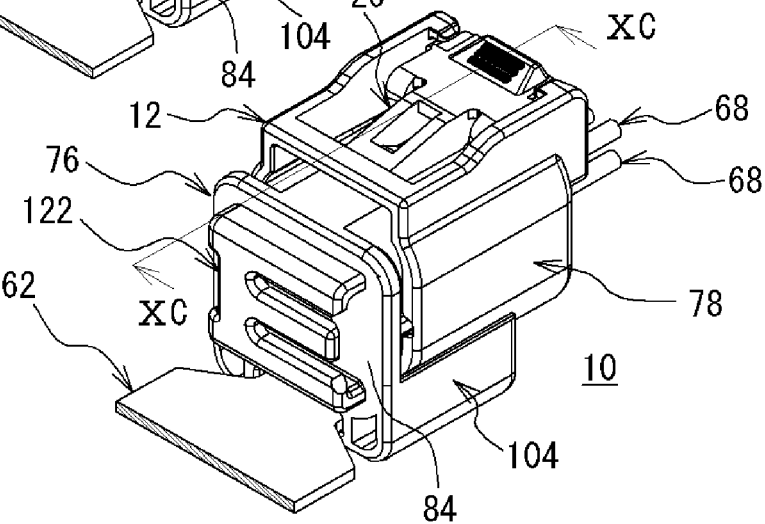
FIG. 10B is a perspective view showing a state in which the cover member and the connector member are mated.
Figure 10C:
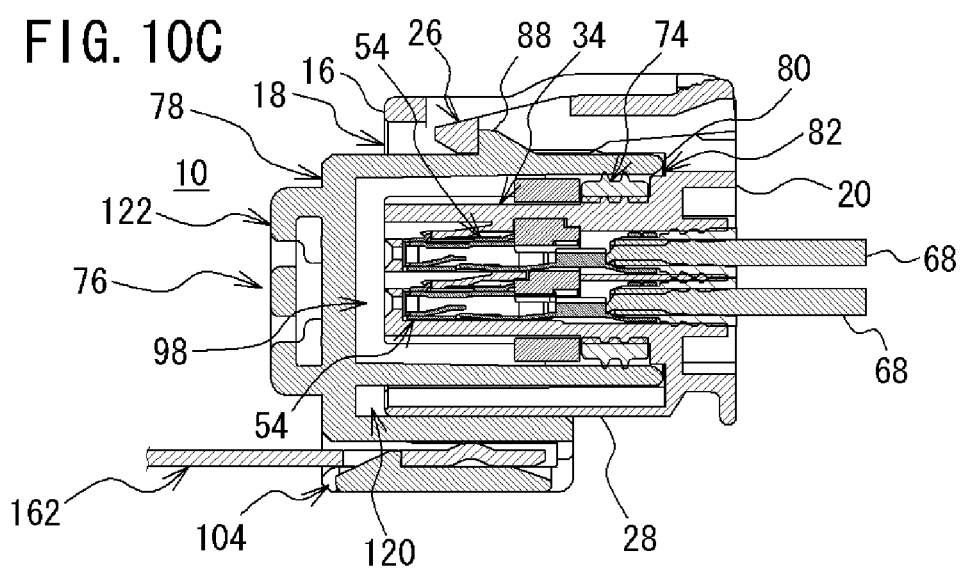
FIG. 10C is a cross-sectional view at a line XC-XC of FIG. 10B.

Then, the connector member 12 is mated with the cover member 76. As shown in FIGS. 10A to 10C, mating of the cover member 76 and the connector member 12 is carried out by causing the front surface 16 of the connector member 12 to be opposed to the front surface part 80 of the cover member 76 and inserting the opening-18 side of the front surface 16 of the connector member 12 from the mating opening 82 of the front surface part 80 of the cover member 76.

In this process, the cover member 76 is configured to be inserted to the gap part 36 between the inner side of the connector housing 14 of the connector member 12 and the contact retaining part 34, and the contact retaining part 34 of the connector member 12 is configured to be inserted to the housing space 98 from the mating opening 82 of the cover member 76.

The bottom-surface-28 side of the connector member 12 is configured to be inserted to the insertion groove part 120 between the bottom surface part 90 and the first attaching part 104 of the cover member 76. Furthermore, the guide projecting parts 96 of the cover member 76 are configured to be mated with and guided by the guide groove parts 48 of the connector member 12.

Furthermore, when the connector member 12 is inserted, as shown in FIG. 10C, the lock mechanism 26 formed on the upper surface 24 of the connector member 12 is engaged with the engagement part 88 formed on the upper surface part 86 of the cover member 76. Hereinabove, mating of the cover member 76 and the connector member 12 is finished.

In this process, the connector member 12 is configured to be attached so as to be approximately horizontal to the attached member 162.

Next, mainly with reference to FIG. 1B, FIG. 3, FIGS. 11A to 11C, and FIGS. 12A to 12C, the case where the mating direction of the cover member 76 with the connector member 12 is approximately perpendicular with respect to the attached member 162 will be described.

Figure 11A:
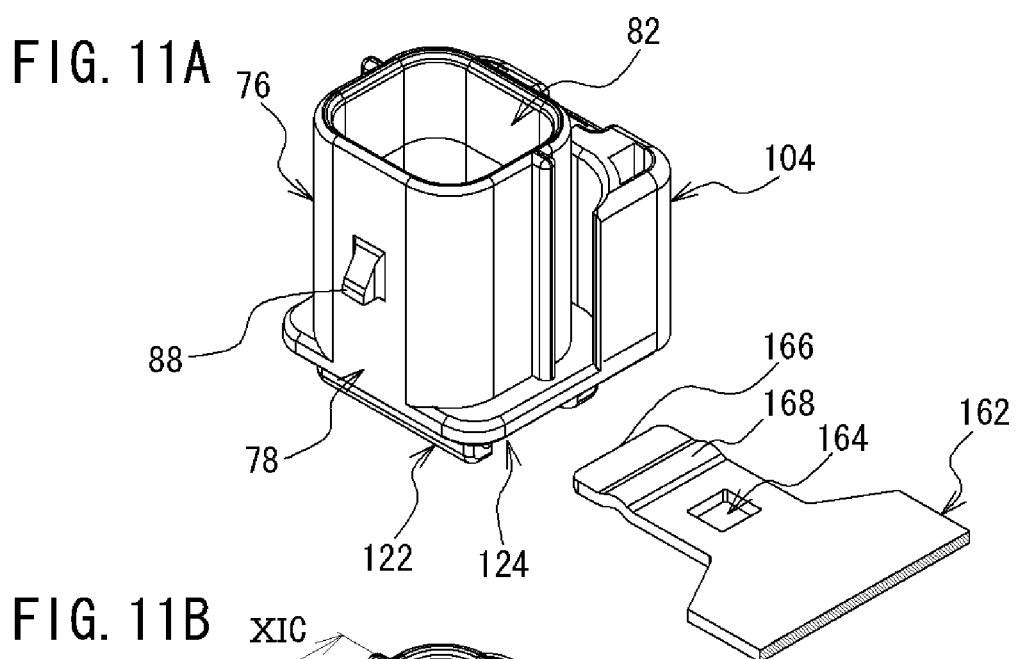
FIG. 11A is a perspective view explaining a case where the attached member is attached to the cover member from another side.
Figure 11B:
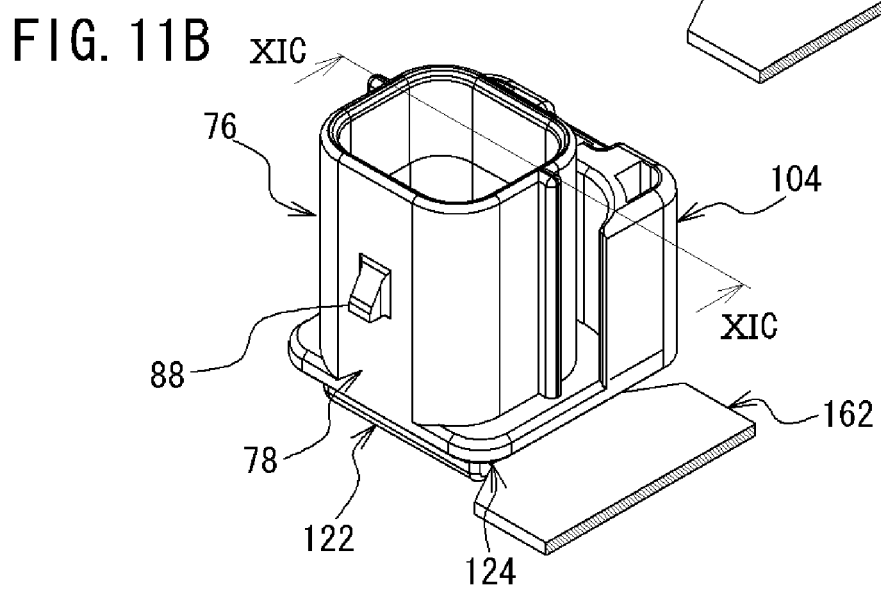
FIG. 11B is a perspective view showing a state in which the attached member is attached to the cover member.
Figure 11C:
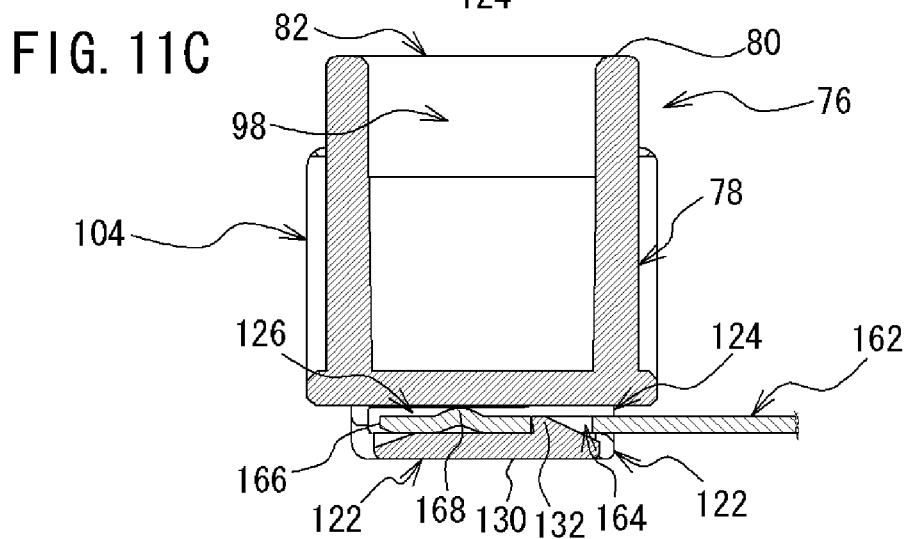
FIG. 11C is a perspective view at a line XIC-XIC of FIG. 11B.

In the case where the mating direction of the connector member 12 is approximately perpendicular with respect to the attached member 162, as shown in FIGS. 11A to 11C, the attached member 162 is attached to the second attaching part 122, which is formed in the rear-surface-part-84 side of the cover member 76. This attachment is carried out from the second-lateral-surface-part-94 side of the cover housing 78 of the cover member 76 so that the tip part 166 of the attached member 162 is inserted first to the second insertion opening 124 of the second attaching part 122, which is formed in the rear-surface-part-84 side. In this process, the attaching direction of the attached member 162 and the cover member 76 is the direction orthogonal to the mating direction of the connector member 12 and the cover member 76.

As shown in FIG. 11C, as well as the case where the above described attached member 162 is attached to the first attaching part 104, the second latch part 128 formed on the second attaching part 122 of the cover member 76 and the latched part 164 formed on the attached member 162 are latched, and the attached member 162 inserted to the second attaching part 122 is prevented from falling and is disposed in the second disposition part 126 in the second attaching part 122. In this process, since the protruding part 168 is formed on the attached member 162, the attached member 162 is pressed in the top-bottom direction in the second disposition part 126 of the second attaching part 122. Therefore, the vibrations, etc. of the cover member 76 are restrained, and stable attachment is enabled.

Then, the connector member 12 is mated with the cover member 76. As shown in FIGS. 12A to 12C, mating of the cover member 76 and the connector member 12 is similar to that of the above described case of mating in the horizontal direction with respect to the attached member 162, wherein only the direction is different. This mating is carried out by causing the front surface 16 of the connector member 12 and the front surface part 80 of the cover member 76 to be opposed to each other and inserting the front-surface-part-80 side of the cover member 76 from the opening 18 of the front surface 16 of the connector member 12.

In this process, the cover member 76 is configured to be inserted to the gap part 36 between the inner side of the connector housing 14 of the connector member 12 and the contact retaining part 34, and the contact retaining part 34 of the connector member 12 is configured to be inserted to the housing space 98 from the mating opening 82 of the cover member 76. Furthermore, the guide projecting parts 96 of the cover member 76 are configured to be mated with and guided by the guide groove parts 48 of the connector member 12.

Furthermore, when the connector member 12 is inserted, as shown in FIG. 12C, the lock mechanism 26 formed on the upper surface 24 of the connector member 12 is engaged with the engagement part 88 formed on the upper surface part 86 of the cover member 76. Hereinabove, mating of the cover member 76 and the connector member 12 is finished.

In this process, the connector member 12 is configured to be attached so as to be approximately perpendicular to the attached member 162.

Hereinabove, mating of the connector member to the cover member 76 attached to the attached member 162 is finished.

By virtue of such a constitution, in a case where the connector member connected by an electric wire to a device or the like provided in a vehicle or the like is to be attached to the attached member, the connector member can be attached in an easily attachable direction.

In the first embodiment, the case where the direction of attaching the cover member 76 to the attached member 162 is the approximately horizontal direction with respect to the direction of mating with the connector member 12 and the case where the direction is the approximately perpendicular direction have been described. However, no limitation is imposed by this, and the attaching part of the cover member may be formed so that the direction facilitates attachment of the connector member with respect to the attached member.

The plurality of attaching parts may be formed so that the directions of attaching the cover member 76 to the attached member 162 are the same direction. For example, a plurality of attaching parts with which the direction of attaching the cover member to the attached member with respect to the mating direction of the connector member 12 is the approximately horizontal direction or the approximately perpendicular direction can be formed.

A plurality of the attaching parts with which the directions of attaching the cover member 76 to the attached member 162 are different directions and a plurality of the attaching parts with which the directions are the same direction may be formed.

In the first embodiment, the two cases in which the attaching part of the cover member 76 is the first attaching part 104 and the second attaching part 122 have been described. However, no limitation is imposed by this, and three or more attaching parts with which the attached member can be inserted from different directions or different orientations may be formed.

In the first embodiment, the connector member 12 and the cover member 76 are mated after the cover member 76 is attached to the attached member 162 first. However, no limitation is imposed by this. The cover member and the connector member may be mated first, and, then, the cover member may be attached to the attached member.

Second Embodiment

Next, a connector 10A of a second embodiment will be described with reference to FIGS. 4 to 8F and FIGS. 13A to 23B. In the first embodiment, the attached member 162 is formed in the plate shape, and the attached member 162 is configured to be attached to the attaching part 104 or 122 of the cover member 76. On the other hand, in the second embodiment, an attached member 162A is formed to have a hole part 170 having an opening in part of a plate body, and a cover member 76 is configured to be attached to the hole part 170 via an attachment auxiliary member 140. The parts common to the constitutions of the first embodiment are denoted by the same reference signs, and detailed descriptions thereof are omitted.

Figure 13A:
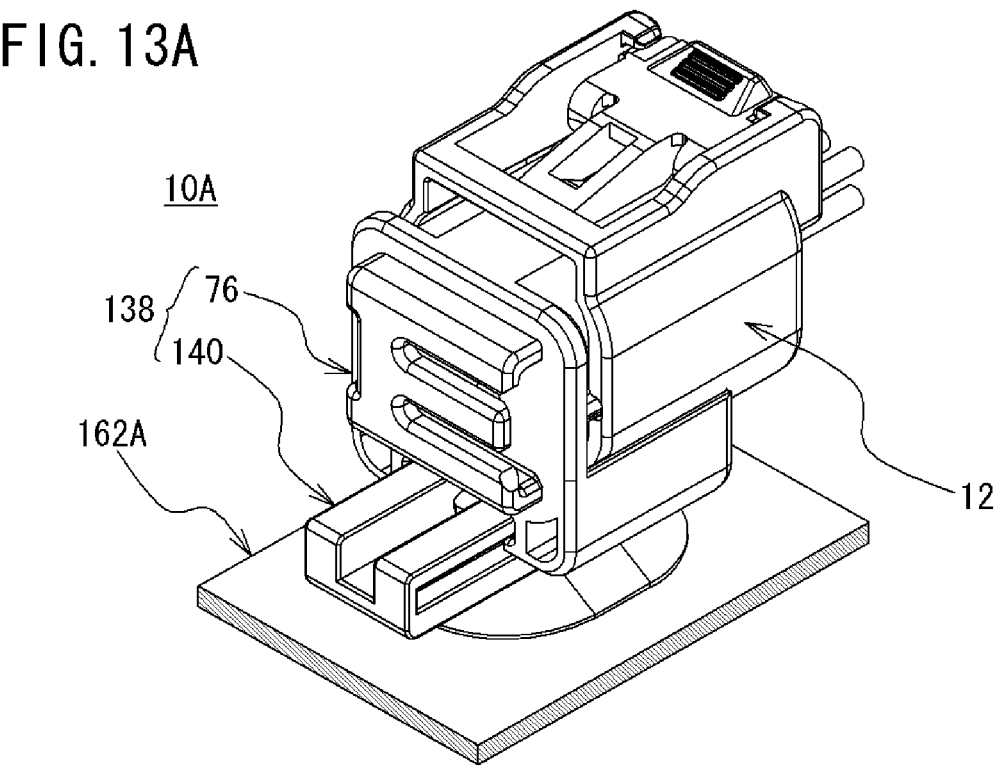
FIG. 13A is a perspective view showing a state in which a connector of a second embodiment is attached to an attached member from one side.
Figure 13B:
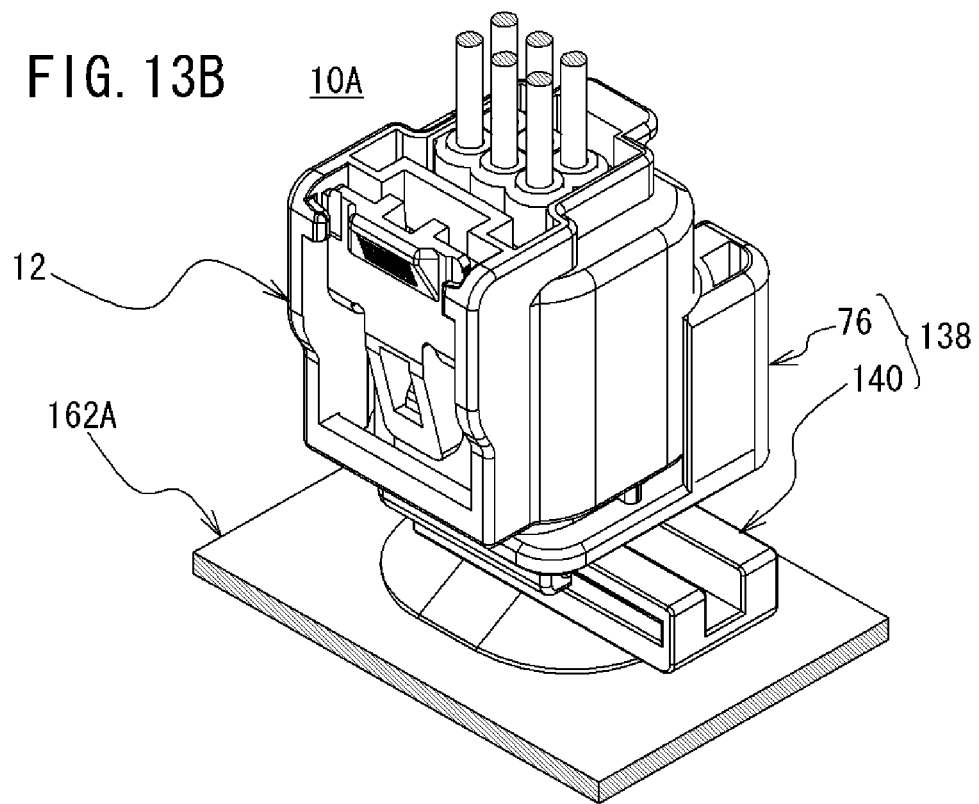
FIG. 13B is a perspective view showing a state in which the connector is attached to the attached member from a different direction.

As shown in FIGS. 13A and 13B, the connector 10A of the second embodiment includes: a connector member 12, which is provided with at least one contact(s) 54 used in inspections, etc. of vehicles, etc. such as two-wheeled vehicles and automobiles; a cover member 76, which is mated with the connector member 12; and the attachment auxiliary member 140, which is combined with the cover member 76 and is attached to the attached member 162A.

Similarly to the first embodiment, the connector member 12 of the second embodiment is to be used in inspections, etc. of vehicles, etc. such as two-wheeled vehicles and automobiles and is to be used by being connected with a counterpart-side connector member provided on an apparatus for the inspection. On the other hand, in a case where the connector member 12 is not used in the inspections, etc., the connector member 12 is fixed to a vehicle or the like and is protected from water, dust, etc. by mating the connector member 12 with the cover member 76, which is combined with the attachment auxiliary member 140 attached in advance to the attached member provided at a predetermined location of the vehicle or the like. The cover member 76 and the attachment auxiliary member 140 combined with each other will be referred to as a cover unit 138.

Figure 14:
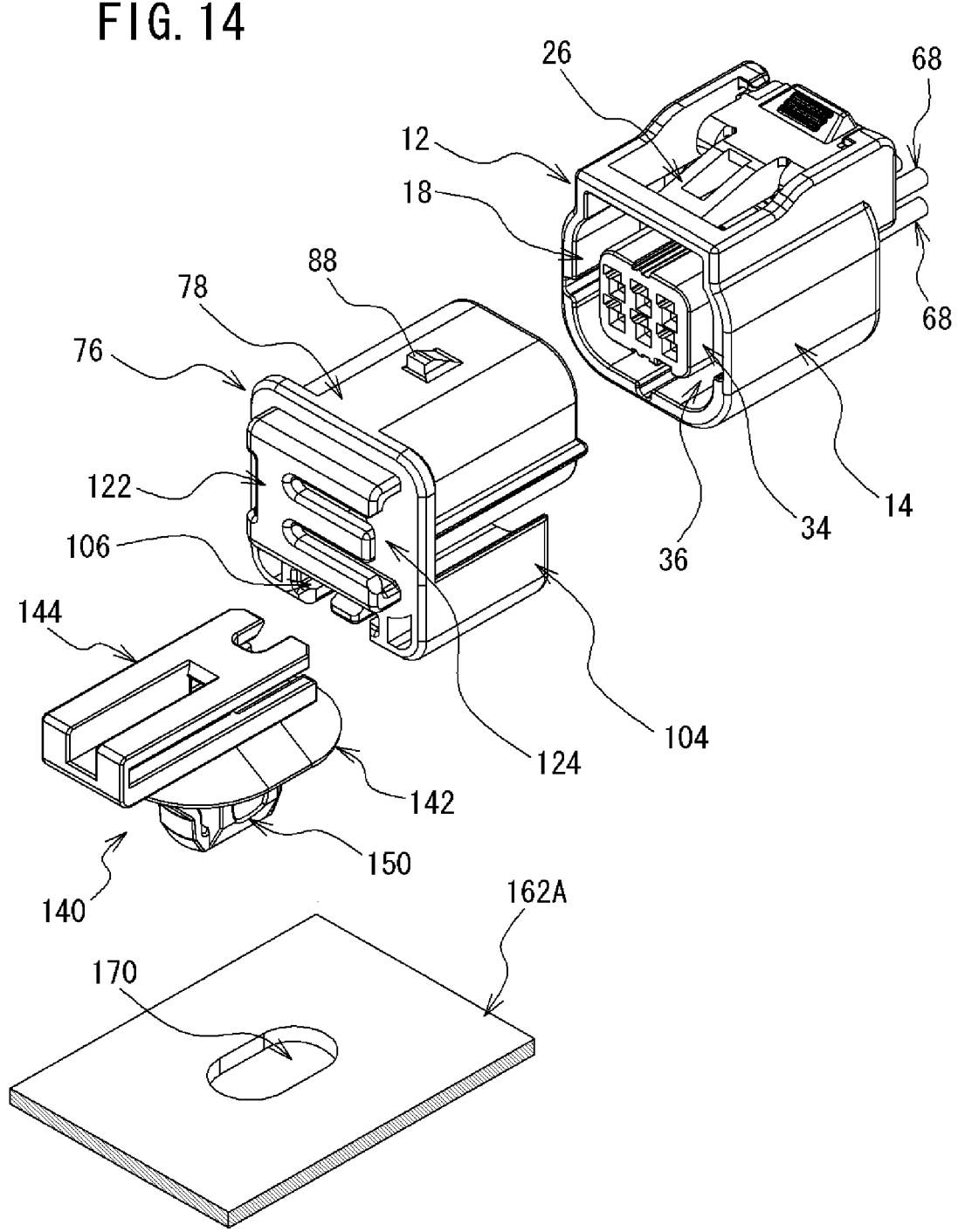
FIG. 14 is an exploded perspective view of the connector and the attached member in the state shown in FIG. 13A.
Figure 15:
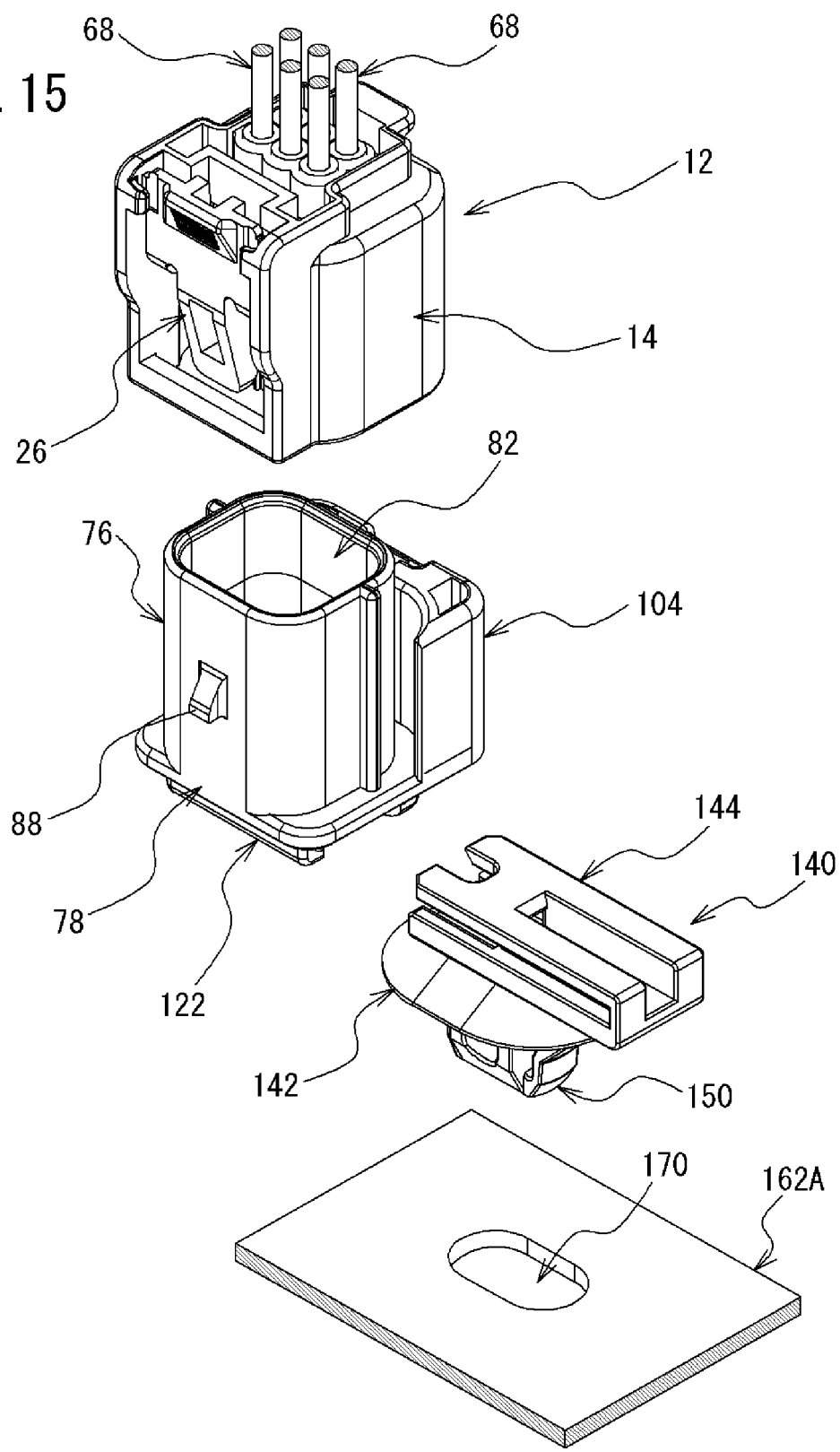
FIG. 15 is an exploded perspective view of the connector and the attached member in the state shown in FIG. 13B.
Figure 16A:
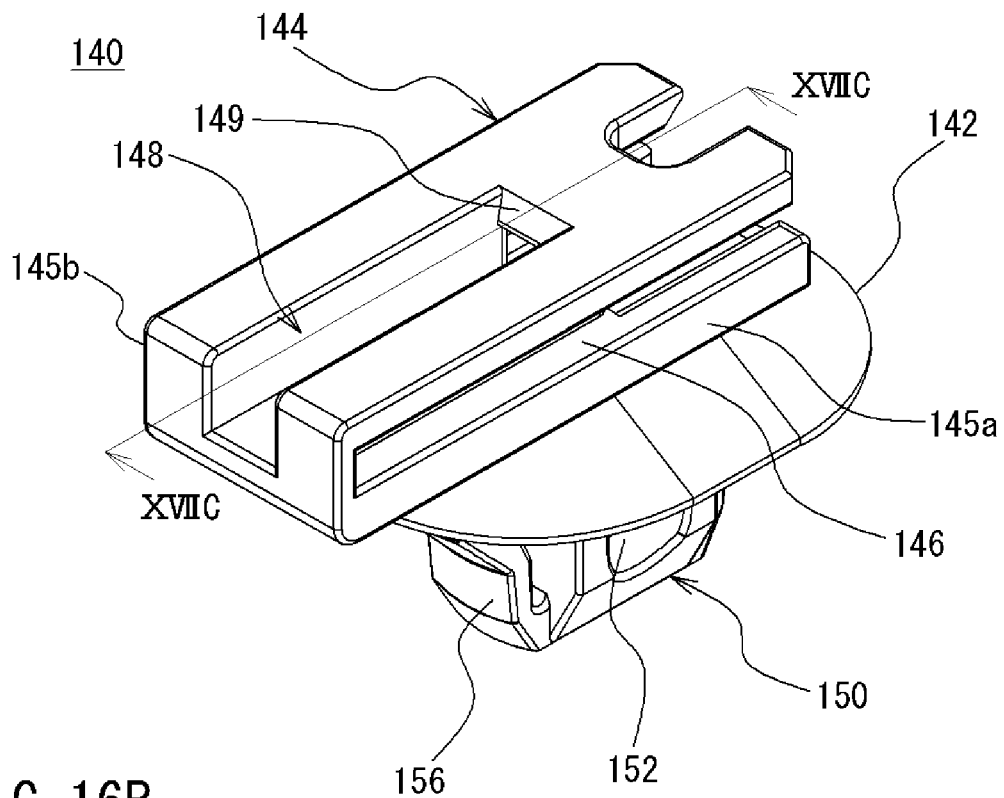
FIG. 16A is a perspective view of an attachment auxiliary member.
Figure 16B:
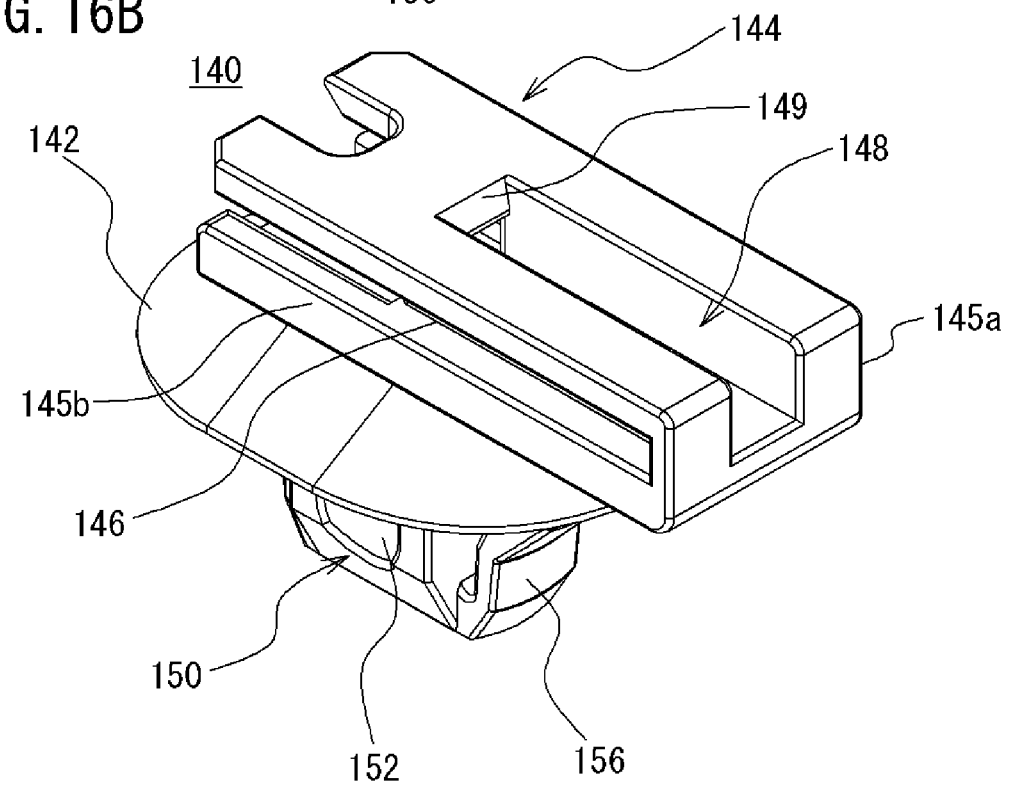
FIG. 16B is a perspective view from another side.
Figure 17A:
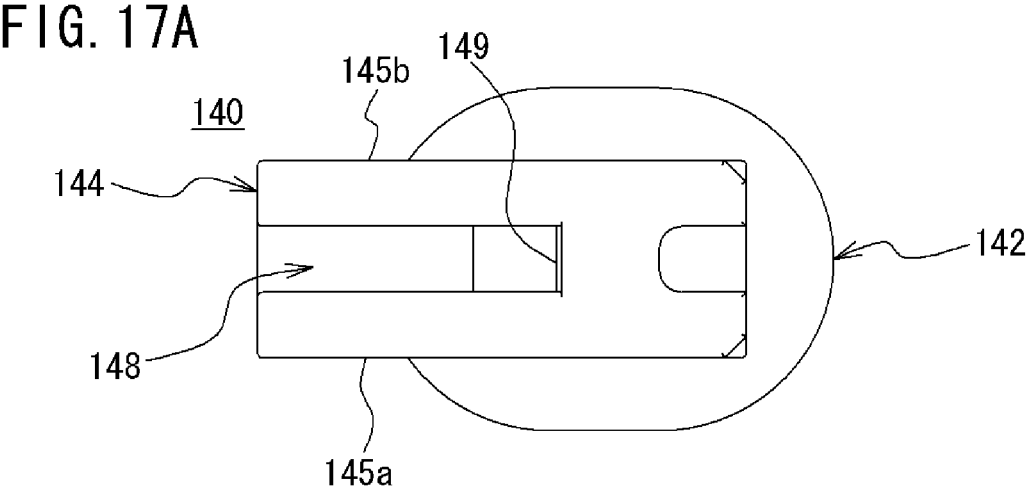
FIG. 17A is a plan view of the attachment auxiliary member.
Figure 17B:
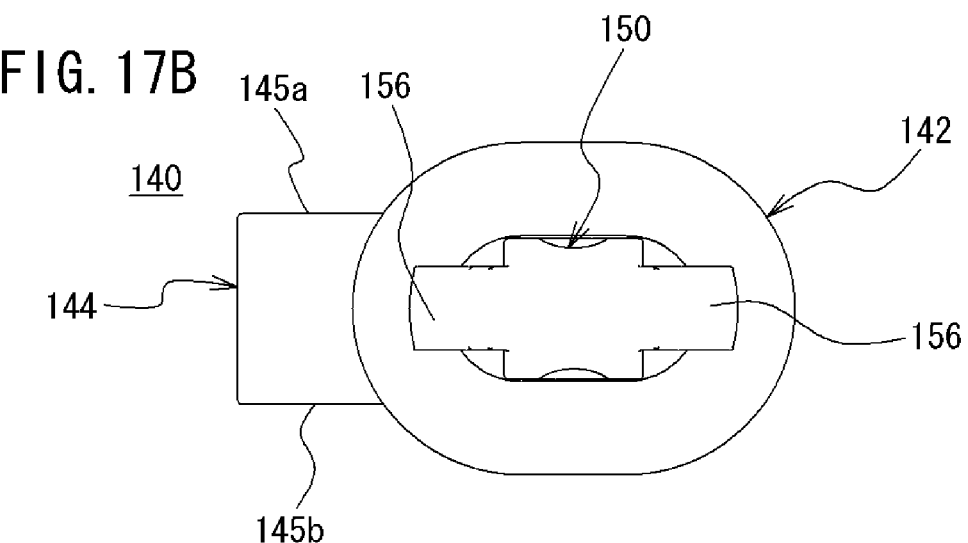
FIG. 17B is a bottom view.
Figure 17C:
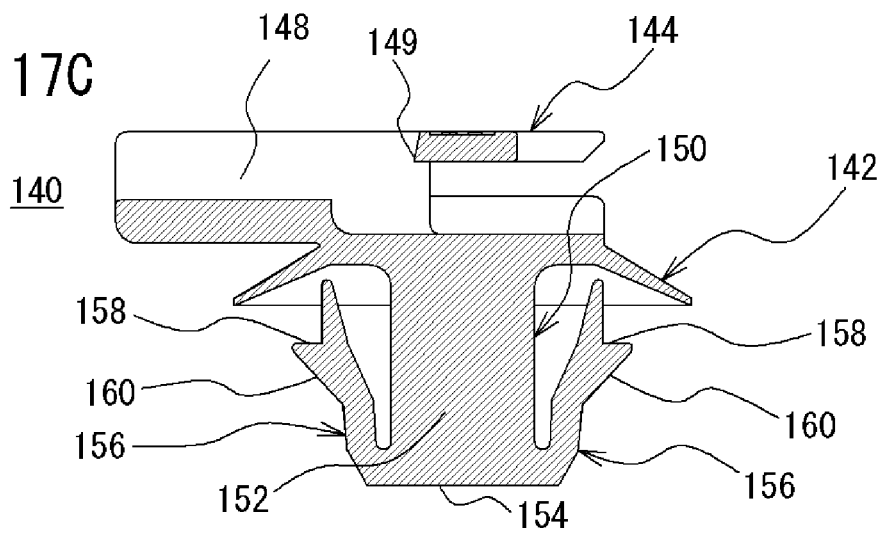
FIG. 17C is a cross-sectional view at a line XVIIC-XVIIC of FIG. 16A.

Similarly to the first embodiment, the cover member 76 of the second embodiment also has a structure capable of selecting a case where attachment is carried out so that the direction of mating with the connector member 12 is an approximately horizontal direction with respect to the attached member 162A as shown in FIG. 13A and FIG. 14 and a case where attachment is carried out so that the direction of mating with the connector member 12 is an approximately perpendicular direction with respect to the attached member as shown in FIG. 13B and FIG. 15.

In other words, the cover member 76 is configured to be in a case where the connector member 12 is horizontally mated with respect to the attached member 162A via the attachment auxiliary member 140 as shown in FIG. 13A and FIG. 14 or in a case where the connector member 12 is perpendicularly mated with respect to the attached member 162A as shown in FIG. 13B and FIG. 15.

As shown in FIG. 14 and FIG. 15, the attached member 162A of the second embodiment is a plate body, and the hole part 170 having an opening in part of the plate body is formed. The hole part 170 of the attached member 162A of the second embodiment is formed, for example, in an approximately square shape.

Hereinafter, each constitution will be described. Since the connector member 12 and the cover member 76 of the second embodiment are the same as the connector member 12 and the cover member 76 of the first embodiment, FIGS. 4 to 8F are referenced, and detailed description will be omitted.

First, with reference to FIGS. 16A and 16B and FIGS. 17A to 17C, the attachment auxiliary member 140, which is combined with the cover member 76 of the second embodiment and constitutes the cover unit 138, will be described. The attachment auxiliary member 140 has a main body part 142, which is to be placed on a first-side surface of the attached member 162A; has, in one side of the main body part 142, a mounting part 144 on which the first attaching part 104 or the second attaching part 122 of the cover member 76 is to be mounted and combined; includes, in another side, a clip part 150 to be attached to the hole part 170 of the attached member 162A; and, for example, these are integrally formed of a resin material.

The main body part 142 is a plate-shaped body having an approximately elliptical shape and is formed in a so-called skirt shape, which widens as it gets close to the attached member 162A. The widest clip-part-150 side of the main body part 142 serves as the part to be placed on the attached member 162A.

The mounting part 144 is formed in the one side of the main body part 142, in other words, in the upper side which is the opposite side of the side in which the main body part 142 is to be placed on the attached member 162A, and the mounting part is formed in an approximately cuboidal shape. The mounting part 144 serves as the part which is fitted in, mounted on, and combined with the first attaching part 104 or the second attaching part 122 of the cover member 76.

In the mounting part 144, at an approximately central part, a latch groove part 148 to which the first latch part 110 of the first attaching part 104 or the second latch part 128 of the second attaching part 122 of the cover member 76 is to be inserted is formed. A latched part 149 with which the first projecting part 114 of the first latch part 110 or the second projecting part 132 of the second latch part 128 is to be latched is formed so as to connect a groove of the latch groove part 148.

In the sides of both lateral surfaces 145a and 145b of the mounting part 144, mounting groove parts 146 in which the first supporting projection part 118 or the second supporting projection part 136 formed on the first attaching part 104 or the second attaching part 122 of the cover member 76 is to be fitted in and moved are formed, respectively.

The clip part 150 includes: a pillar-shaped part 152 extending from an approximately central part of the main body part 142 to the other side, in other words, to the side in which the main body part 142 is to be placed on the attached member 162A; and a plurality, for example, a pair of elastic piece parts 156 extending from an end of the pillar-shaped part 152 to the main-body-part-142 side.

Each of the elastic piece part 156 has a step-shaped supporting part 158, which supports the second-side surface of the attached member 162A, and a taper 160 is formed between the end of the pillar-shaped part 152 to each of the supporting part 158.

The attachment auxiliary member 140 and the cover member 76 are combined to serve as the cover unit 138 (see FIGS. 18A to 18C and FIGS. 21A to 21C). The cover unit 138 is combined when the mounting part 144 of the attachment auxiliary member 140 is mounted on the first attaching part 104 or the second attaching part 122 of the cover member 76. Herein, the direction in which the cover member 76 and the connector member 12 are mated can be configured to be different directions with respect to the attached member 162A in the case where the mounting part 144 of the attachment auxiliary member 140 is mounted on the first attaching part 104 of the cover member 76 and the case where the mounting part 144 is mounted on the second attaching part 122.

Next, assembling of the cover member 76 and the attachment auxiliary member 140 constituting the cover unit 138 of the second embodiment, attachment of the cover unit 138 to the attached member 162A, and mating of the cover member 76 and the connector member 12 will be described.

In the second embodiment, as described above, the cover member 76 of the cover unit 138 enables selection of the direction mating with the connector member 12 with respect to the attached member 162A between the case where the cover member 76 is approximately horizontally attached and the case where the cover member 76 is approximately perpendicularly attached.

First, mainly with reference to FIG. 13A, FIG. 14, FIGS. 18A to 20B, the case where the mating direction of the cover member 76 with the connector member 12 is approximately horizontal with respect to the attached member 162A will be described.

Figure 18A:
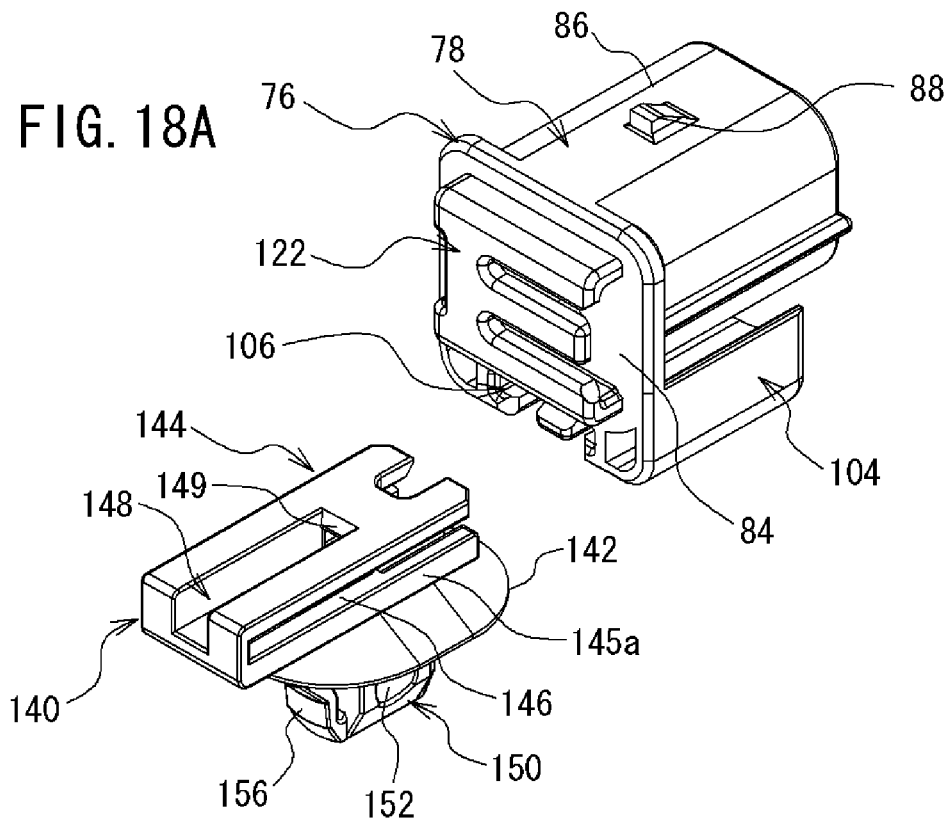
FIG. 18A is a perspective view explaining a case where the attachment auxiliary member is mounted on the cover member from one side.
Figure 18B:
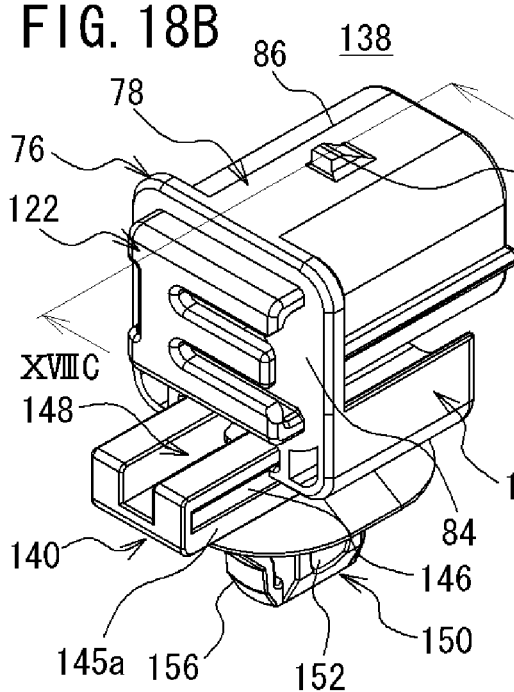
FIG. 18B is a perspective view showing a state of a cover unit in which the cover member and the attachment auxiliary member are mounted.
Figure 18C:
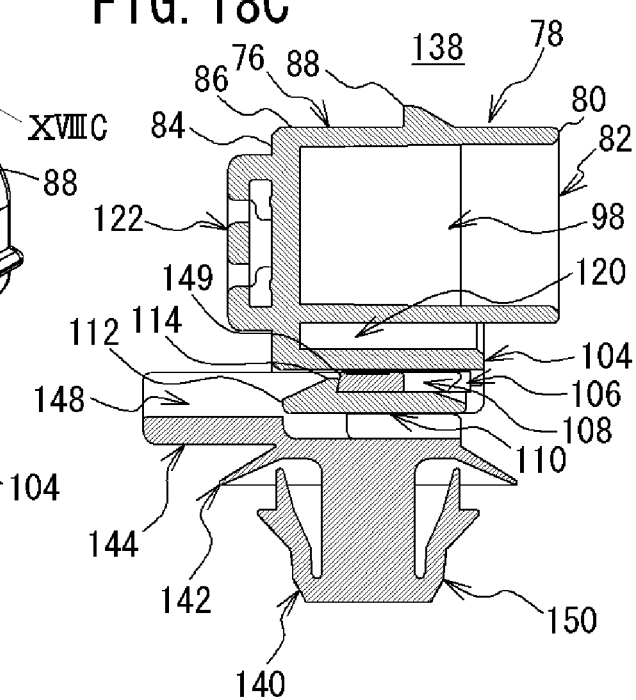
FIG. 18C is a cross-sectional view at a line XVIIIC-XVIIIC of FIG. 18B.

In the case where the direction of mating with the connector member 12 is approximately horizontal with respect to the attached member 162A, first, as shown in FIGS. 18A to 18C, the mounting part 144 of the attachment auxiliary member 140 is mounted on the first attaching part 104 of the cover member 76. This mounting is carried out by inserting the first latch part 110 of the first attaching part 104 of the cover member 76 to the latch groove part 148 of the mounting part 144 of the attachment auxiliary member 140 and fitting and moving the first supporting projection parts 118 of the first attaching part 104 in the mounting groove parts 146 of the mounting part 144.

Then, as shown in FIG. 18C, when the first projecting part 114 of the first latch part 110 is latched with the latched part 149 of the mounting part 144, it is prevented from falling, the latched part 149 is disposed in the first disposition part 108 in the first attaching part 104, mounting of the cover member 76 and the attachment auxiliary member 140 is completed, and the cover unit 138 is completed.

In this case, the direction in which the cover member 76 is mated with the connector member 12 and an axial direction of the clip part 150 of the attachment auxiliary member 140 are approximately orthogonal to each other.

Figure 19A:
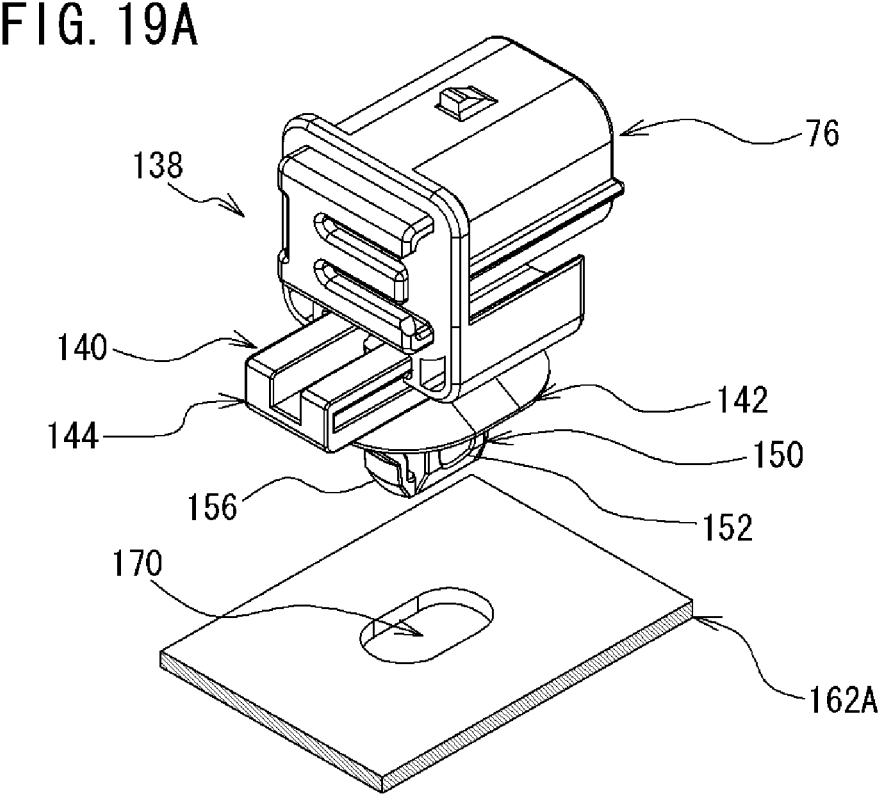
FIG. 19A is a perspective view explaining a case where the cover unit, in which the attachment auxiliary member is mounted on the cover member from the one side, is attached to the attached member.
Figure 19B:
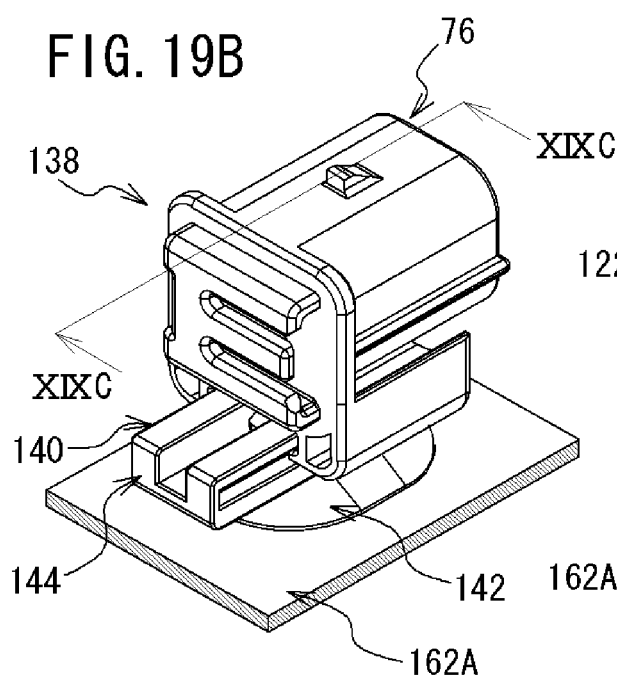
FIG. 19B is a perspective view showing a state in which the cover unit is attached to the attached member.
Figure 19C:
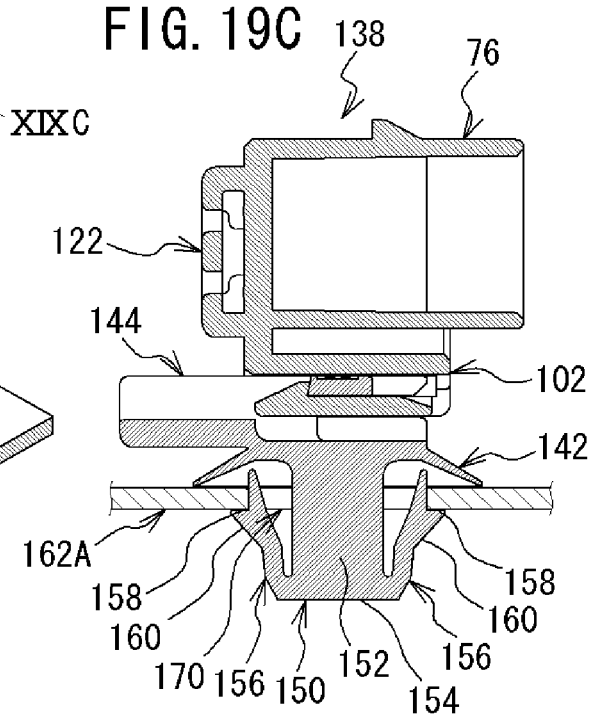
FIG. 19C is a cross-sectional view at a line XIXC-XIXC of FIG. 19B.

Next, as shown in FIGS. 19A to 19C, the clip part 150 of the attachment auxiliary member 140 of the cover unit 138 is attached to the attached member 162A. This attachment is carried out by inserting the clip part 150 of the attachment auxiliary member 140 of the cover unit 138 to the hole part 170, which is formed in the attached member 162A, from a tip-154 side, which is opposite to the main body part 142 of the pillar-shaped part 152.

In this process, since the tapers 160 of the elastic piece parts 156 of the clip part 150 abut the outer periphery of the hole part 170, the elastic piece parts 156 are inserted while they are elastically deformed. Furthermore, when the clip part 150 is inserted, the main body part 142 of the attachment auxiliary member 140 abuts the attached member 162A, and the tapers 160 of the elastic piece parts 156 are detached from the outer periphery of the hole part 170. As a result, the elastic force of the elastic piece parts 156, which have been elastically deformed, is released, and they return to original positions so that the supporting parts 158 of the elastic piece parts 156 are attached so as to support the outer periphery of the hole part 170 of the attached member 162A (see FIG. 19C).

The attached member 162A is configured to be attached by being sandwiched by the main body part 142 of the attachment auxiliary member 140 and the supporting parts 158 of the elastic piece parts 156 of the clip part 150. Regarding the cover unit 138 attached to the attached member 162A, the direction in which the cover member 76 and the connector member 12 are mated is approximately parallel to the attached member 162A.

Figure 20A:
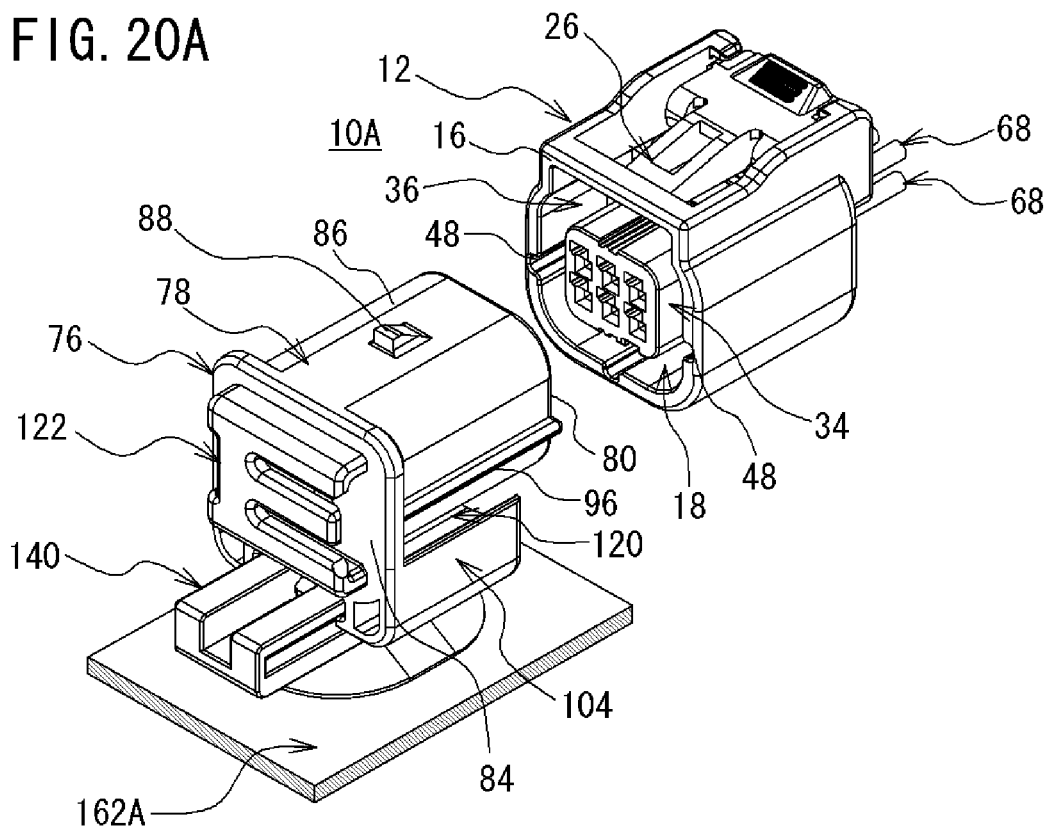
FIG. 20A is a perspective view explaining mating of the cover unit, in which the attachment auxiliary member is mounted on the cover member from the first direction, and the connector member.
Figure 20B:
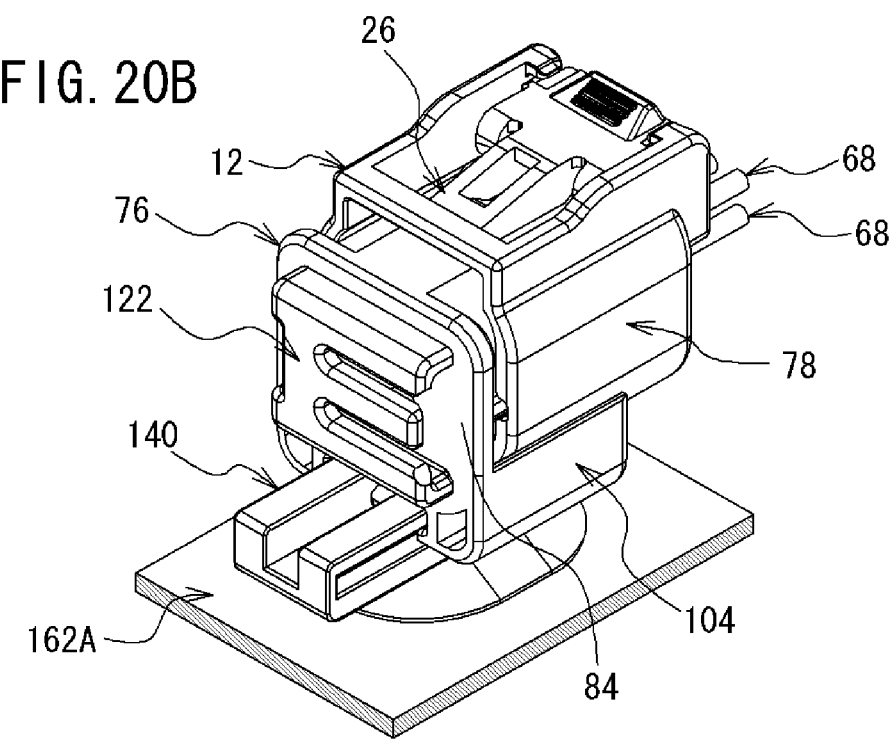
FIG. 20B is a perspective view showing a state in which the cover unit is mated with the connector member.

Then, as shown in FIGS. 20A and 20B, the connector member 12 is mated with the cover member 76 of the cover unit 138. Mating of the cover member 76 and the connector member 12 is carried out in a manner similar to the mating of the connector member 12 and the cover member 76 of the first embodiment. Detailed description thereof is the same as that of the first embodiment and is therefore omitted. Hereinabove, mating of the cover member 76 and the connector member 12 is finished.

In this process, the connector member 12 is configured to be attached so as to be approximately horizontal to the attached member 162.

Next, with reference to FIG. 13B, FIG. 15, FIGS. 21A to 23B, the case where the mating direction of the cover member 76 and the connector member 12 is approximately perpendicular with respect to the attached member will be described.

Figure 21A:
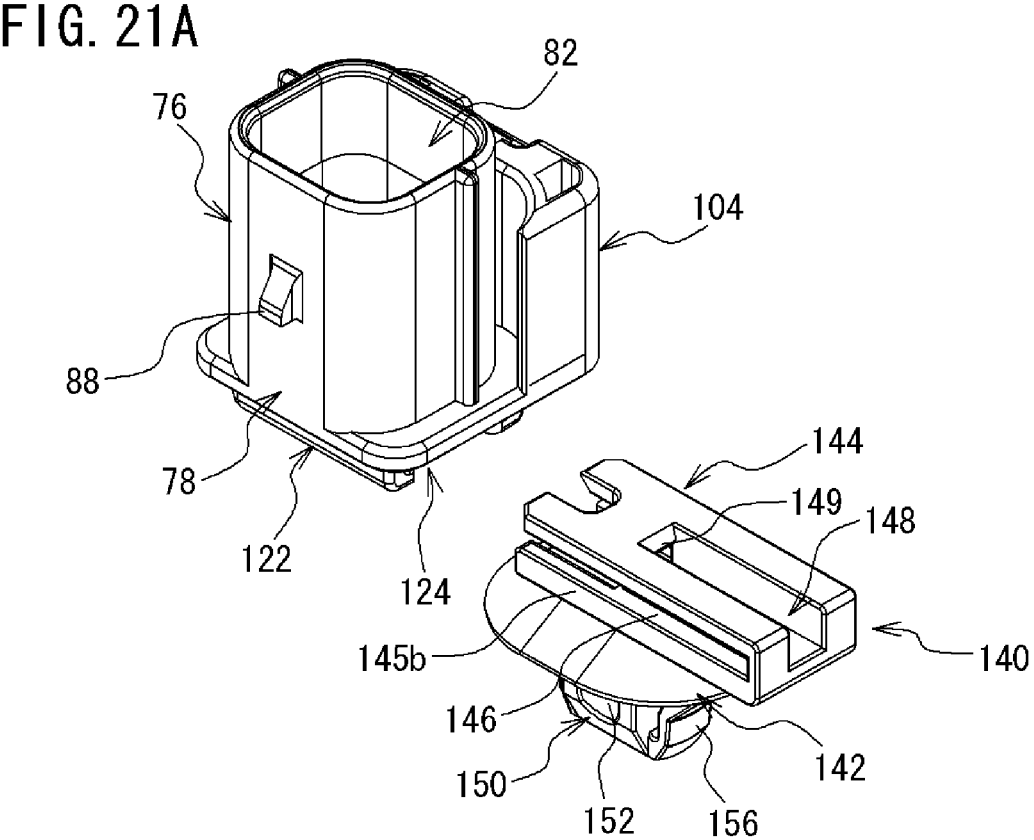
FIG. 21A is a perspective view explaining a case where the attachment auxiliary member is mounted on the cover member from another side.
Figure 21B:
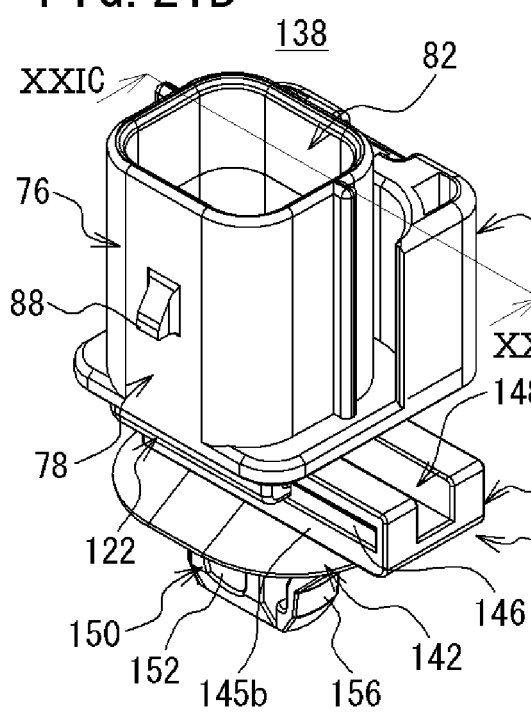
FIG. 21B is a perspective view showing a state of the cover unit in which the cover member and the attachment auxiliary member are mounted.
Figure 21C:
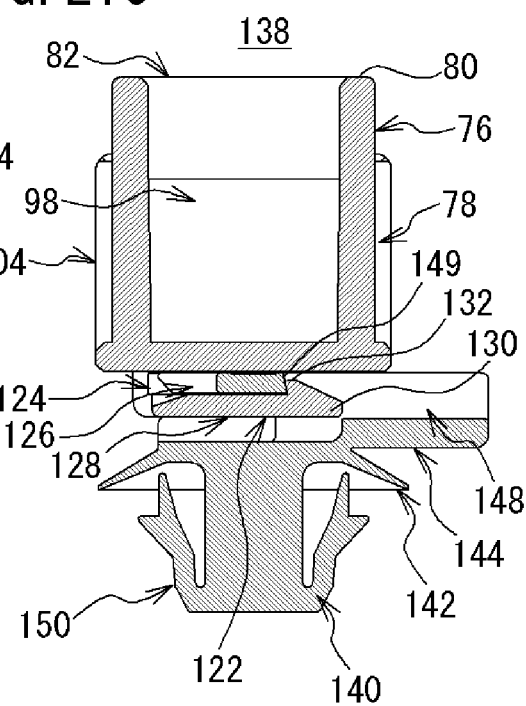
FIG. 21C is a cross-sectional view at a line XXIC-XXIC of FIG. 21B.

In the case where the direction of mating with the connector member 12 is approximately perpendicular with respect to the attached member 162A, first, as shown in FIGS. 21A to 21C, the mounting part 144 of the attachment auxiliary member 140 is mounted on the second attaching part 122 of the cover member 76. This mounting is carried out by inserting the second latch part 128 of the second attaching part 122 of the cover member 76 to the latch groove part 148 of the mounting part 144 of the attachment auxiliary member 140 and fitting and moving the second supporting projection parts 136 of the second attaching part 122 in the mounting groove parts 146 of the mounting part 144.

Then, as shown in FIG. 21C, when the second projecting part 132 of the second latch part 128 is latched with the latched part 149 of the mounting part 144, it is prevented from falling, the latched part 149 is disposed in the second disposition part 126 in the second attaching part 122, mounting of the cover member 76 and the attachment auxiliary member 140 is completed, and the cover unit 138 is completed.

In this case, the direction in which the cover member 76 is mated with the connector member 12 and the axial direction of the clip part 150 of the attachment auxiliary member 140 are approximately parallel to each other.

Next, as shown in FIGS. 22A to 22C, the clip part 150 of the attachment auxiliary member 140 of the cover unit 138 is attached to the attached member 162A. Similarly to the above described case, this attachment is carried out by inserting the clip part 150 of the attachment auxiliary member 140 of the cover unit 138 to the hole part 170, which is formed in the attached member 162A, from the tip part 166 of the pillar-shaped part 152 (see FIG. 22C). Detailed description thereof is the same as the above description and is therefore omitted.

Regarding the cover unit 138 attached to the attached member 162A, the direction in which the cover member 76 and the connector member 12 are mated is approximately perpendicular to the attached member 162A.

Figures 23A, 23B:
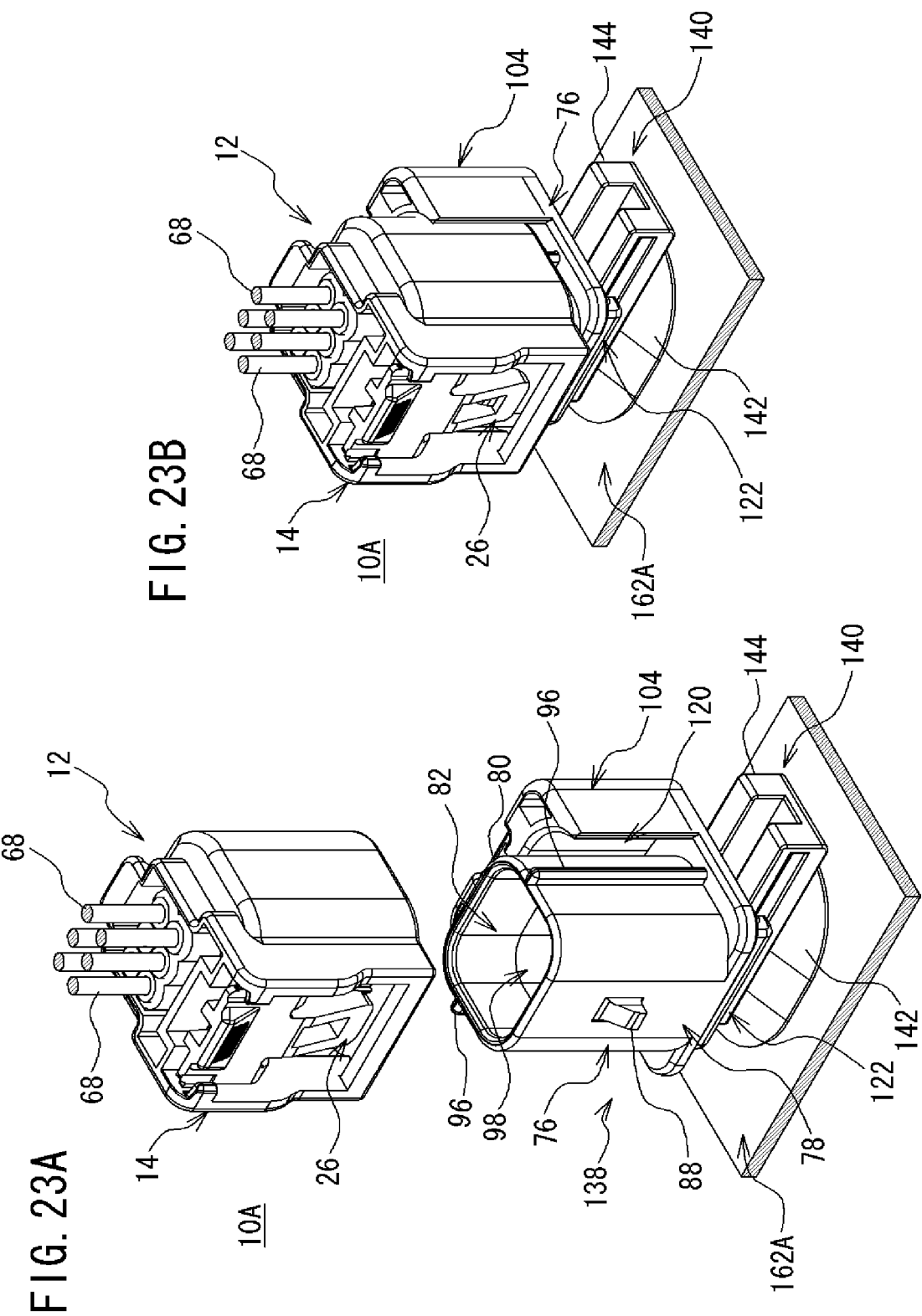
FIG. 23A is a perspective view explaining mating of the cover unit, in which the attachment auxiliary member is mounted on the cover member from the other side, and the connector member.
FIG. 23B is a perspective view showing a state in which the cover unit is mated with the connector member.

Then, as shown in FIGS. 23A and 23B, the connector member 12 is mated with the cover member 76 of the cover unit 138. Mating of the cover member 76 and the connector member 12 is carried out in a manner similar to that of the first embodiment. Detailed description thereof is the same as that of the first embodiment and is therefore omitted. Hereinabove, mating of the cover member 76 and the connector member 12 is finished.

In this process, the connector member 12 is configured to be attached so as to be approximately perpendicular to the attached member 162A.

Hereinabove, mating of the connector member 12 to the cover member 76 attached to the attached member 162A is finished.

By virtue of such a constitution, in a case where the connector member 12 connected by the electric wire 68 to an apparatus or the like provided in a vehicle or the like is to be attached to the attached member, the connector member can be attached in an easily attachable direction. Only forming the hole part 170 in the attached member 162A enables attachment of the cover unit without requiring a special shape.

In the second embodiment, the case where the direction of attaching the cover member 76 to the attached member 162A is the approximately horizontal direction with respect to the direction of mating with the connector member 12 and the case where the direction is the approximately perpendicular direction have been described. However, no limitation is imposed by this, and the attaching part of the cover member may be formed so that the direction facilitates attachment of the connector member with respect to the attached member.

In the second embodiment, the two cases in which the attaching part of the cover member 76 is the first attaching part 104 and the second attaching part 122 have been described. However, no limitation is imposed by this, and three or more attaching parts with which the attached member can be inserted from different directions may be formed.

In the second embodiment, the connector member 12 and the cover member 76 are mated after the cover unit 138 is attached to the attached member 162A first. However, no limitation is imposed by this. The cover member of the cover unit and the connector member may be mated first, and, then, the attachment auxiliary member of the cover unit may be attached to the attached member.

The second embodiment uses the cover unit 138, which is a combination of the attachment auxiliary member 140 with the cover member 76 in order to attach the unit to the hole part 170 of the attached member 162A. However, no limitation is imposed by this. Constitutions similar to the clip part formed in the attachment auxiliary member may be directly formed in the cover member, for example, at positions at which the attaching parts are formed so that the cover member can be attached to the hole part of the attached member.

What is claimed is:

1. A cover member that is mated with a connector member and has a cover housing attached to an attached member, wherein
the cover housing has:
a mating opening, for mating with the connector member, formed on one side of the cover housing;
a closed rear surface formed on another side opposed to the mating opening; and
a plurality of attaching parts for attach en to the attached member, wherein at least one of the plurality of attaching parts includes an insertion opening to which the attached member is to be inserted, wherein
each of the attaching part is provided with a latch part latched with a latched part provided on the attached member that is inserted.

2. The cover member according to claim 1, wherein
the attaching parts are formed so that directions of mating with the connector member are different directions with respect to the attached member.

3. The cover member according to claim 1, wherein
the attaching parts include:
a first attaching part with which the cover housing can be attached to the attached member along a direction in which the connector member is mated; and
a second attaching part with which the cover housing can be attached to the attached member in a direction orthogonal to the direction in which the connector member is mated.

4. The cover member according to claim 1, wherein
the attaching parts are formed so that directions of mating with the connector member are the same direction with respect to the attached member.

5. The cover member according to claim 1, wherein
the attaching parts include:

at least an attaching part with which a direction of mating with the connector member is a different direction with respect to the attached member; and
at least another attaching part with which the direction is the same as at least one of the attaching parts having the different directions are formed.

6. The cover member according to claim 1, wherein
the cover housing is configured to be attached by inserting the attached member to the attaching part.

7. The cover member according to claim 1, wherein
the cover housing is configured to be attached by inserting the attaching part to a hole part formed in the attached member.

8. A cover unit comprising:
a cover member having a cover housing mated with a connector member and an attachment auxiliary member attached to the cover member, wherein:
the cover housing has a mating opening, for mating with the connector member, formed one side of the cover housing and a closed rear surface formed on another side opposed to the mating opening,
a plurality of attaching parts are formed on the cover housing,
at least one of the plurality of attaching parts includes an insertion opening, and
the attachment auxiliary member has a mounting part mounted on any of the attaching parts, wherein
each of the attaching part is provided with a latch part latched with a latched part provided on the attachment auxiliary member that is inserted.

9. The cover unit according to claim 8, wherein
the attaching parts of the cover housing are formed so that directions of mating with the connector member are different directions with respect to the attached member.

10. The cover unit according to claim 9, wherein
the attaching parts include:
a first attaching part with which the cover housing can be attached to the attached member along a direction in which the connector member is mated; and
a second attaching part with which the cover housing can be attached to the attached member in a direction orthogonal to the direction in which the connector member is mated.

11. The cover unit according to claim 8, wherein
the attaching parts of the cover housing are formed so that directions of mating with the connector member are the same direction with respect to the attached member.

12. The cover unit according to claim 8, wherein
the attaching parts of the cover housing include;
at least an attaching part with which a direction of mating with the connector member is a different direction with respect to the attached member; and
at least another attaching part with which the direction is the same as at least one of the attaching parts having the different directions are formed.

13. The cover unit according to claim 8, wherein
the attachment auxiliary member has a clip part inserted and fixed in a hole part formed in the attached member.

14. A connector comprising:
a connector member; and
a cover member having a cover housing attached to an attached member, wherein
the cover housing has:
a mating opening, for mating with the connector member, formed one side of the cover housing, closed rear surface formed on another side opposed to the mating opening, and a plurality of attaching parts for attachment to the attached member, wherein at least one of the plurality of attaching parts includes an insertion opening to which the attached member is to be inserted, wherein each of the attaching part is provided with a latch part latched with a latched part, provided on the attached member that is inserted.

15. A connector comprising:

a connector member; and a cover unit including:

a cover member having a cover housing mated with a connector member and an attachment auxiliary member attached to the cover member, wherein the cover housing has a mating opening, for mating with the connector member, formed one side of the cover housing and a closed rear surface formed on another side opposed to the mating opening, a plurality of attaching parts are formed on the cover housing, wherein at least one of the plurality of attaching parts includes an insertion opening, and the attachment auxiliary member has a mounting part mounted on any of the attaching parts, wherein each of the attaching part is provided with a latch part latched with a latched part latched part provided on the attachment auxiliary member that is inserted.

* * * * *